(12) United States Patent
Salehi et al.

(10) Patent No.: US 12,277,567 B2
(45) Date of Patent: Apr. 15, 2025

(54) METHOD AND SYSTEM FOR AUTOMATION AND ROLE-BASED CONTROL IN MARKETPLACE

(71) Applicants: RAKUTEN MOBILE, INC., Tokyo (JP); Rakuten Symphony, Inc., Tokyo (JP)

(72) Inventors: Farnaz Salehi, Tokyo (JP); Ramachandran Padmanabha Rao, Indore (IN)

(73) Assignees: RAKUTEN MOBILE, INC., Tokyo (JP); RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/012,777

(22) PCT Filed: Oct. 24, 2022

(86) PCT No.: PCT/US2022/047545
§ 371 (c)(1),
(2) Date: Dec. 23, 2022

(87) PCT Pub. No.: WO2024/049455
PCT Pub. Date: Mar. 7, 2024

(65) Prior Publication Data
US 2024/0303182 A1 Sep. 12, 2024

(30) Foreign Application Priority Data

Aug. 30, 2022 (IN) .............................. 202241049596

(51) Int. Cl.
*G06Q 30/00* (2023.01)
*G06F 11/36* (2006.01)
(Continued)

(52) U.S. Cl.
CPC ........... *G06Q 30/018* (2013.01); *G06F 11/36* (2013.01); *G06F 11/3664* (2013.01);
(Continued)

(58) Field of Classification Search
CPC ............... G06F 11/3664; G06F 21/604; G06F 2221/2141; G06F 21/108; G06F 16/9535; H04L 43/50; G06Q 50/188; G06Q 30/018
See application file for complete search history.

(56) References Cited

U.S. PATENT DOCUMENTS

| 9,268,672 | B1 | 2/2016 | Gupta | |
| 2002/0040352 | A1* | 4/2002 | McCormick | ......... G06Q 50/188 |
| | | | | 705/80 |

(Continued)

OTHER PUBLICATIONS

International Search Report issued Jan. 25, 2023 in Application No. PCT/US22/47545.
Written Opinion issued Jan. 25, 2023 in Application No. PCT/US22/47545.

*Primary Examiner* — Tuan A Vu
(74) *Attorney, Agent, or Firm* — Sughrue Mion, PLLC

(57) ABSTRACT

A method and system for automated and role-based control of a centralized marketplace for products. The method includes: mapping a first role, from among a plurality of predetermined roles of marketplace participants, to a first user based on first registration information, mapping a second role, from among the plurality of predetermined roles of marketplace participants, to a second user based on second registration information; executing, for the first user, a first microservice based on the first role of the first user, the first role being a developer role; and executing, for the second user, a second microservice based on the second role of the second user, the second role being a customer role, wherein the first microservice comprises a publishing process for publishing a product of the first user in the centralized marketplace, and wherein the second microservice (Continued)

comprises a deployment process for deploying the product to an infrastructure of the second user.

18 Claims, 12 Drawing Sheets

(51) Int. Cl.
*G06F 11/3668* (2025.01)
*G06F 21/60* (2013.01)
*G06Q 30/018* (2023.01)
*G06F 16/9535* (2019.01)
*G06F 21/10* (2013.01)
*G06Q 50/18* (2012.01)
*H04L 43/50* (2022.01)

(52) U.S. Cl.
CPC ........ *G06F 11/3692* (2013.01); *G06F 21/604* (2013.01); *G06F 16/9535* (2019.01); *G06F 21/108* (2023.08); *G06F 2221/2141* (2013.01); *G06Q 50/188* (2013.01); *H04L 43/50* (2013.01)

(56) References Cited

U.S. PATENT DOCUMENTS

| | | | |
|---|---|---|---|
| 2002/0162059 | A1* | 10/2002 | McNeely ................ H04L 43/50 714/724 |
| 2007/0234291 | A1 | 10/2007 | Ronen et al. |
| 2016/0044520 | A1 | 2/2016 | Iyer et al. |
| 2019/0171550 | A1 | 6/2019 | Eizenman et al. |
| 2020/0250074 | A1 | 8/2020 | Zhang et al. |
| 2022/0019638 | A1* | 1/2022 | Stephenson ......... G06F 16/9535 |
| 2024/0070236 | A1* | 2/2024 | Cella .................... G06F 21/108 |

* cited by examiner

METHOD AND SYSTEM FOR AUTOMATION AND ROLE-BASED CONTROL IN MARKETPLACE

CROSS-REFERENCE TO RELATED APPLICATIONS(S)

This Application is a National Stage of International Application No. PCT/US2022/047545 filed Oct. 24, 2022, claiming priority based on Indian Patent Application No. 202241049596 filed Aug. 30, 2022.

TECHNICAL FIELD

Methods and systems consistent with example embodiments of the present disclosure relate to automation and role-based control of end-to-end processes in a centralized marketplace.

BACKGROUND

Handling end-to-end processes such as publishing, deploying, and operating products or services is one of the most complex and tedious processes for participants in a market. The related art does not provide end-to-end solutions for integrating end-to-end processes such as publishing, deploying, and operating products or services in a centralized marketplace so that all participants of the market (i.e., operators and customers on one side and developers and vendors on the other side). Thus, it is a challenging task to guide all user roles and provide the required information when many users in different roles are involved. To this end, the related art separates marketplace platforms and provides different platforms for different user roles. For example, in the related art, procurement of products and services is separated into a procurement marketplace platform that besides the platform's administrators only provided marketplace roles for vendors and customers in their specific (two) roles (i.e., to present, to sell, and to buy products and services).

However, in a highly fragmented market where different customers (e.g., network operators) require different levels of information and formats to onboard products or services from developers (e.g., vendors), it is a challenging task for both customers and vendors to meet the information requirements of their respective business partner.

As a result, in the related art, it is very difficult for all participants of a marketplace (e.g., vendors, customers, developers, administrators, reviewers, etc.) to immediately comply with the required level of information to either seamlessly onboard (publish) products or seamlessly deploy said published products, for example, to a network operator's existing infrastructure (e.g. telecommunication infrastructure). For example, in the related art, the task of integrating network services into a network operator's existing telecommunications infrastructure is complex and may require a lead time of between 6 to 10 months including multiple interactive steps (e.g., high-level design clearance, countless configuration evaluations, etc.) involving a high degree of planning and management effort. In case a vendor is not a developer, multi-entity communication during the integration of products or services gets even more difficult and is prone to human and technical errors. Therefore, the slow and burdensome communication between the market participants according to the related art is unsatisfactory.

Furthermore, the large effort that is required to deploy, for example, network services into an existing telecommunication infrastructure is particularly inefficient if vendors (or customers) discover only after a product or service has been integrated into the existing infrastructure that said product or service is not compatible or does not function as expected. In the related art, such an undesired outcome leaves vendors with no choice but to stop the integration of, for example, network services and find an appropriate solution to the problems (i.e., withdrawing the offered products and services from a procurement platform until shortcomings are resolved by the developers). To this end, in the related art, a vendor (i.e., a developer if the vendor is not the developer) needs, for example, the cooperation of the network operators (i.e., customers) to either schedule on-site visits to install new infrastructure or to upgrade, for example, the existing infrastructure (e.g., telecommunications infrastructure) to make it compatible with the product or services being offered. In some cases, the developer may resort to redeveloping products and services to be compatible with another vendor's (e.g., network infrastructure manufacturer) existing infrastructure (e.g., telecommunication infrastructure). In other cases, a dilemma may leave the customer with no choice but to select another developer (e.g., vendor) for the deployment of products or services.

In either case, the complex interplay of roles to achieve a successful procurement of a product or service and deployment problems thereof are unsatisfactory to all participants of the marketplace, as product and service delivery can be further delayed, and human resource waste and frustration are inevitable.

Apart from the above publishing issues on the developer side, the actual performance of the products and services offered by the developers may vary depending on the environment and infrastructure. As a result, in the related art, it is very difficult for the customer (e.g., network operator) to accurately evaluate the actual performance of products or services until they are deployed to their existing infrastructure (e.g. telecommunications infrastructure), which leaves the risk of procurement solely to the customer.

SUMMARY

According to example embodiments, a method and system are provided for automating and role-based control in a marketplace. The automating and role-based control in a marketplace enables all participants of a centralized marketplace to fulfill their role (roles) within one marketplace platform without separation of marketplace platforms by role (e.g., without separation into a procurement system, a technical evaluation system for both, developers and customers, etc.). To this end, the automated and role-based controlled marketplace provides a test system for product onboarding (publishing) on the developer side and a test system for product deployment on the customer side.

In particular, the method and system realize standardized and guided end-to-end processes (e.g., a unified sign-up process for all participants, a standardized publishing process for developers (e.g., vendors), a standardized deployment process for customers (e.g., network operators) to provide a common and easy-to-review standard/format for each of said market participants, etc.). The role (roles) of a participant is according to the registration information of the market participant, wherein each user can be mapped (i.e., assigned) to one or more roles based on the user information which allows for an easy-to-operate environment (e.g., role-based workflow environment) within the centralized marketplace and tasks sharing between users in accordance with their particular role (i.e., vendors which perform tests for publishing products or services suitable for customers, customers which perform tests for the deployment of products and services based on the specifics of their existing telecommunication infrastructure, etc.). The role-based task sharing has an advantage that, based on double-sided lab (test) environments (i.e., separate testing environments for developers and customers) within the centralized marketplace, the time to publish and the time to deploy products or services (e.g., software products) can be minimized, and human errors are eliminated. For example, when a vendor or developer registers in the marketplace, the marketplace platform determines their role and allows an upload and testing of products and services via a publishing microservice in a guided manner that allows the vendor or developer to test the product or service in a predetermined test environment. To this end, the developer tests the product or service in a developer lab environment (publishing test environment) provided by either a customer or a platform operator (e.g., a network operator or a platform administrator can determine the developer (publishing) test environment for the products or services) within the marketplace. On the other hand, when, for example, a customer (e.g., a network operator) registers in the marketplace. The marketplace platform determines its role in the marketplace (e.g., reviewer, customer, administrator, etc.) and allows the customer to test the product or service in a deployment test environment. The customer (e.g., customer or platform administrator) can determine the development test environment for the products or services within the marketplace or upload products or services to the customer's existing telecommunication infrastructure for monitoring the operation of the products or services in real-world conditions.

As result, the integrated testing and monitoring of products and services within the marketplace has an advantage that performance, accurate configuration, etc., of the product can be determined before the purchase or during a trial period of the product or service. This role-based, controlled execution of end-to-end processes within a marketplace has an advantage of automating procurement management and creating a level playing field for all market participants with reduced risk and increased speed of deployment.

According to example embodiments, a system for automated and role-based control of a centralized marketplace for products, the system comprising: a memory storing instructions, and at least one processor configured to execute the instructions to: map a first role, from among a plurality of predetermined roles of marketplace participants, to a first user based on first registration information obtained from the first user, map a second role, from among the plurality of predetermined roles of marketplace participants, to a second user based on second registration information obtained from the second user; execute, for the first user, at least one first microservice of the centralized marketplace based on the first role of the first user, the first role being a developer role; and execute, for the second user, at least one second microservice of the centralized marketplace based on the second role of the second user, the second role being a customer role, wherein the at least one first microservice comprises a publishing process for publishing a product of the first user in the centralized marketplace, and wherein the at least one second microservice comprises a deployment process for deploying the product to a telecommunications infrastructure of the second user.

The at least one processor may be further configured to execute the instructions to: obtain, via a first screen for registering a user to the centralized marketplace, the first registration information from the first user and the second registration information from the second user; receive, via a second screen for logging in to the centralized marketplace, first log-in credentials of the first user and second log-in credentials of the second user; grant different access rights to the first user and the second user based on the first role and the second role.

The at least one processor may be further configured to execute the instructions to execute the at least one first microservice to: receive artifacts of the product, the product being a software application; allocate the artifacts to at least one publishing test environment for testing the product; obtain results of the testing; and present the results to the first user based on the first role.

The at least one publishing test environment is hosted by an operator of the centralized marketplace.

The products may include enterprise software for telecommunications operators, and virtualized network services.

The at least one processor may be further configured to execute the instructions to execute the at least one second microservice to: receive artifacts of the product, the product being a software application; allocate the artifacts to at least one deployment test environment for testing the product of the first user; obtain results of the testing; and present the results to the second user based on the second role.

The at least one deployment test environment is hosted by an operator of the centralized marketplace.

The products comprise: published products of users mapped to the first role which have been tested in at least one publishing test environment and approved for publication.

The at least one processor is further configured to execute the instructions to: map a third role, from among the plurality of predetermined roles of marketplace participants, to a third user, the third role being a reviewer role; execute, for the third user, at least one third microservice of the centralized marketplace based on the third role of the third user, wherein the at least one third microservice comprises a reviewing process for reviewing the product submitted by the first user for publication.

The at least one processor is further configured to execute the instructions to: map a fourth role, from among the plurality of predetermined roles of marketplace participants, to a fourth user, the fourth role being an administrator role; execute, for the fourth user, at least one fourth microservice of the centralized marketplace based on the fourth role of the fourth user, wherein the at least one fourth microservice may include an approval process, and wherein the at least one processor may be further configured to execute the instructions to execute the at least one fourth microservice to: register the first user with the first role based on the obtained first registration information and approval by the fourth user, register the second user with the second role based on the obtained second registration information and approval by the fourth user, and approve, based on approval by the fourth user, registration of a third user with a third role, from among the plurality of predetermined roles, the third role being a reviewer role; and approve the product of the first user for publication on the marketplace based on the publishing process and a reviewing process performed by the third user.

According to example embodiments, a method for automated and role-based control of a centralized marketplace for products, the method includes: mapping a first role, from among a plurality of predetermined roles of marketplace participants, to a first user based on first registration information obtained from the first user, mapping a second role, from among the plurality of predetermined roles of marketplace participants, to a second user based on second registration information obtained from the second user; executing, for the first user, at least one first microservice of the centralized marketplace based on the first role of the first user, the first role being a developer role; and executing, for the second user, at least one second microservice of the centralized marketplace based on the second role of the second user, the second role being a customer role, wherein the at least one first microservice comprises a publishing process for publishing a product of the first user in the centralized marketplace, and wherein the at least one second microservice comprises a deployment process for deploying the product to a telecommunications infrastructure of the second user.

Obtaining, via a first screen for registering a user to the centralized marketplace, the first registration information from the first user and the second registration information from the second user; receiving, via a second screen for logging in to the centralized marketplace, first log-in credentials of the first user and second log-in credentials of the second user; granting different access rights to the first user and the second user based on the first role and the second role.

The executing the at least one first microservice may include: receiving artifacts of the product, the product being a software application; allocating the artifacts to at least one publishing test environment for testing the product; obtaining results of the testing; and presenting the results to the first user based on the first role.

The at least one publishing test environment is hosted by an operator of the centralized marketplace.

The products may include enterprise software for telecommunications operators, and virtualized network services.

The executing the at least one second microservice may include: receiving artifacts of the product, the product being a software application; allocating the artifacts to at least one deployment test environment for testing the product of the first user; obtaining results of the testing; and presenting the results to the second user based on the second role.

The at least one deployment test environment is hosted by an operator of the centralized marketplace.

The products may include published products of users mapped to the first role which have been in at least one publishing test environment for testing the product of the first user in the centralized market place.

The method may further include mapping a third role, from among the plurality of predetermined roles of marketplace participants, to a third user, the third role being a reviewer role; executing, for the third user, at least one third microservice of the centralized marketplace based on the third role of the third user, wherein the at least one third microservice comprises a reviewing process for reviewing the product submitted by the first user for publication.

The method may further include: mapping a fourth role, from among the plurality of predetermined roles of marketplace participants, to a fourth user, the fourth role being an administrator role; executing, for the fourth user, at least one fourth microservice of the centralized marketplace based on the fourth role of the fourth user, wherein the at least one fourth microservice comprises an approval process comprising: registering the first user with the first role based on the obtained first registration information and approval by the fourth user, registering the second user with the second role based on the obtained second registration and approval by the fourth user, and approving, based on approval by the fourth user, a registration of a third user with a third role, from among the plurality of predetermined roles, the third role being a reviewer role; and approving the product of the first user for publication on the marketplace based on the publishing process and a reviewing process performed by the third user.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like reference numerals denote like elements, and wherein.

DETAILED DESCRIPTION

Figure 1:
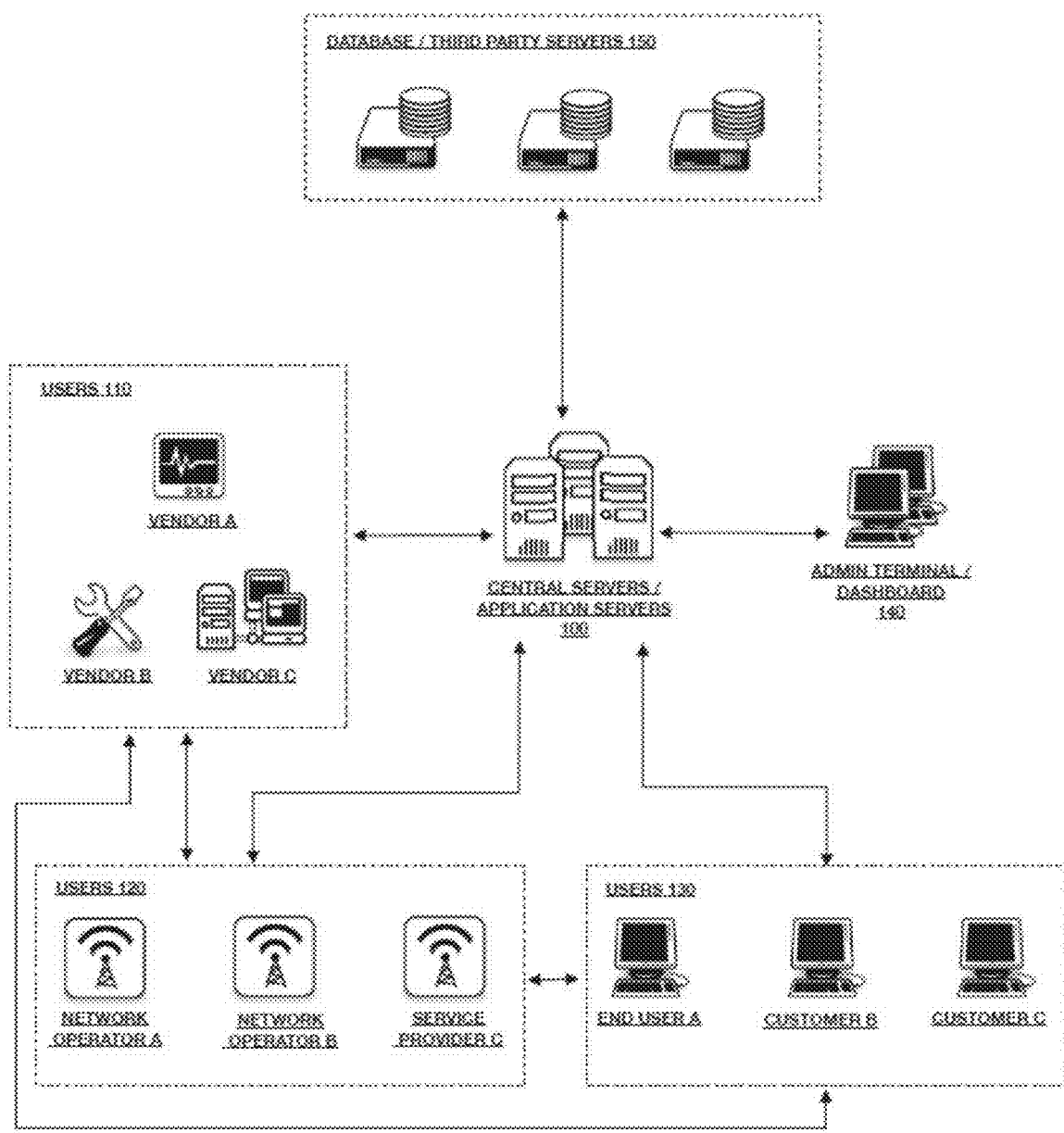
FIG. 1 illustrates a diagram of a general system architecture according to one or more embodiments.

The following detailed description of exemplary embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the disclosure described herein, a display page may include information residing in the computing device's memory, which may be transmitted from the computing device over a network to a database center and vice versa. The information may be stored in memory at each of the computing device, a data storage resided at the edge of the network, or on the servers at the database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of networked device, including but not limited to mobile devices and phones such as cellular phones (e.g., any "smart phone"), a personal computer, server computer, or laptop computer; personal digital assistants (PDAs); a roaming device, such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices, such as devices including short-range ultra-high frequency (UHF) device, near-field communication (NFC), infrared (IR), and Wi-Fi functionality, among others.

Phrases and terms similar to "software", "application", "app", and "firmware" may include any non-transitory computer readable medium storing thereon a program, which when executed by a computer, causes the computer to perform a method, function, or control operation.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also include a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, components, features, options, and/or attributes of the disclosure described herein. For example, the portal can be a web page accessed with a web browser, mobile device application, or any application or software residing on a computing device.

Example embodiments disclosed herein relate to a centralized marketplace for products and services. While example embodiments refer to telecommunications related products and services, it is understood that the disclosure is not limited thereto and the marketplace may be for telecommunications and/or non-telecommunications related products. For example, the marketplace may provide applications and services for business enterprises in general (e.g., customer service-related applications, inventory management applications, financial forecasting or planning applications, accounting applications, etc.

FIG. 1 illustrates a diagram of a general network architecture according to one or more embodiments. Referring to FIG. 1, users 110, 120, and 130 can be in bi-directional communication over a secure network with central servers or application servers 100 according to one or more embodiments. In addition, users 110, 120, 130 may also be in direct bi-directional communication with each other via the marketplace platform network system according to one or more embodiments. Here, users 110 can be any type of vendor or service provider, such as vendors A, B, and C offering to either users 120 or users 130 similar, same, or different services or products with respect to a network or service operator. In particular, users 110 can provide any type of telecommunications-related service or product, such as cellular service network deployment, network capacity update, operational monitoring, data analytics and reporting, and any other suitable services. Each of users 110 can communicate with servers 100 via their respective terminals or portals. Users 120 can be network operators A and B and service provider C, which may offer similar, same, or different services or products to users 130 or users 110. Here, users 110 or 120 can be any type of telecommunications vendor or network service provider, network operator, carrier, broadband provider, Unified Communications as a Service (UCaaS) providers, wired or wireless cellular network service provider, radio access network (RAN), web host, or any network or telecommunications related service or network provider, among others. Each of users 120 can communicate with servers 100 via their respective terminals or portals. Users 130 can be any type of end user or customer of users 120 or users 110, such as end user A or customers B and C, or the end user purchasing and/or receiving the telecommunications network related services of users 110 or users 120. Each of users 130 can communicate with servers 100 via their respective terminals or portals.

Still referring to FIG. 1, central servers 100 of the marketplace platform system according to one or more embodiments can be in further bi-directional communication with admin terminal/dashboard 140. Here, admin terminal/dashboard 140 can provide various tools to any of users 110, 120, and 130, or a sales team or a content/product creation team to manage various customers/end users and customer leads, wherein such managing can include, among others, creating, editing, and promoting various types of telecommunications network services or product sales promotional campaigns, advertising, offerings, and ordering options for customers and other users of the marketplace platform according to one or more embodiments. In addition, admin terminal/dashboard 140 may also include various types of access privileges to different users of the marketplace platform system according to one or more embodiments. Further, central servers 100 according to one or more embodiments can be in further bi-directional communication with database/third party servers 150. Here, servers 150 can provide various types of data storage (such as cloud-based storage), web services, content creation tools, data streams, data feeds, and/or provide various types of third-party support services to central servers 100 of the marketplace platform. However, it is contemplated within the scope of the present disclosure described herein that the network services marketplace platform process and system according to one or more embodiments can include any type of general network architecture.

Still referring to FIG. 1, one or more servers or terminals of elements 100-150 may include a personal computer (PC), a printed circuit board comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, one or more servers, terminals, and users 100-150 may include a set of components, such as a processor, a memory, a storage component, an input component, an output component, a communication interface, and a JSON UI rendering component. The set of components of the device may be communicatively coupled via a bus.

The bus may comprise one or more components that permit communication among the set of components of one or more of servers or terminals of elements 100-150. For example, the bus may be a communication bus, a cross-over bar, a network, or the like. The bus may be implemented using single or multiple (two or more) connections between the set of components of one or more of servers or terminals of elements 100-150. The disclosure is not limited in this regard.

One or more servers or terminals of elements 100-150 may comprise one or more processors. The one or more processors may be implemented in hardware, firmware, and/or a combination of hardware and software. For example, the one or more processors may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The one or more processors also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The one or more processors may control overall operation of one or more of servers or terminals of elements 100-150 and/or of the set of components of one or more of servers or terminals of elements 100-150 (e.g., memory, storage component, input component, output component, communication interface, rendering component).

One or more of servers or terminals of elements 100-150 may further comprise memory. In some embodiments, the memory may comprise a random access memory (RAM), a read only memory (ROM), an electrically erasable programmable ROM (EEPROM), a flash memory, a magnetic memory, an optical memory, and/or another type of dynamic or static storage device. The memory may store information and/or instructions for use (e.g., execution) by the processor.

A storage component of one or more of servers or terminals of elements 100-150 may store information and/or computer-readable instructions and/or code related to the operation and use of one or more of servers or terminals of elements 100-150. For example, the storage component may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

One or more of servers or terminals of elements 100-150 may further comprise an input component. The input component may include one or more components that permit one or more of servers and terminals 110-140 to receive information, such as via user input (e.g., a touch screen, a keyboard, a keypad, a mouse, a stylus, a button, a switch, a microphone, a camera, and the like). Alternatively or additionally, the input component may include a sensor for sensing information (e.g., a global positioning system (GPS) component, an accelerometer, a gyroscope, an actuator, and the like).

An output component any one or more of servers or terminals of elements 100-150 may include one or more components that may provide output information from the device 100 (e.g., a display, a liquid crystal display (LCD), light-emitting diodes (LEDs), organic light emitting diodes (OLEDs), a haptic feedback device, a speaker, and the like).

One or more of servers or terminals of elements 100-150 may further comprise a communication interface. The communication interface may include a receiver component, a transmitter component, and/or a transceiver component. The communication interface may enable one or more of servers or terminals of elements 100-150 to establish connections and/or transfer communications with other devices (e.g., a server, another device). The communications may be enabled via a wired connection, a wireless connection, or a combination of wired and wireless connections. The communication interface may permit one or more of servers or terminals of elements 100-150 to receive information from another device and/or provide information to another device. In some embodiments, the communication interface may provide communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface may provide communications with another device via a device-to-device (D2D) communication link, such as FlashLinQ, WiMedia, Bluetooth, ZigBee, Wi-Fi, LTE, 5G, and the like. In other embodiments, the communication interface may include an Ethernet interface, an optical interface, a coaxial interface, an infrared interface, a radio frequency (RF) interface, or the like.

Figure 2:
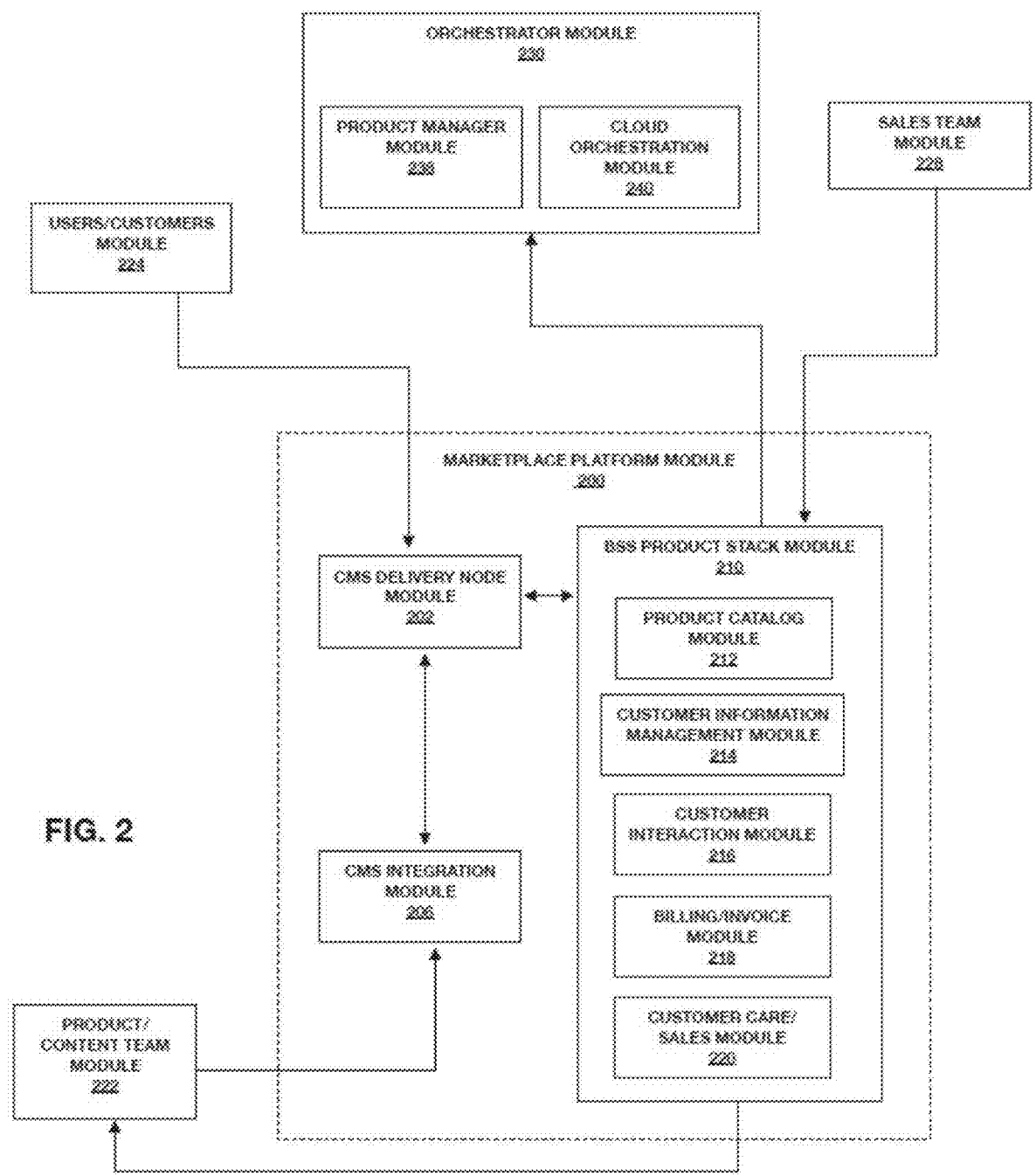
FIG. 2 illustrates a diagram of the centralized marketplace according to one or more embodiments.

FIG. 2 illustrates a centralized marketplace and trading platform system according to one or more embodiments. Referring to FIG. 2, marketplace platform module or portal 200 can include a Customer Management System (CMS) delivery node module 202 which can be a portal for the marketplace platform and is in bidirectional communication with a Business Support Systems (BSS) product stack module or portal 210 (including any one or more of modules 212-220 illustrated in FIG. 2), and a CMS integration module or portal 206 for content management and integrating with various repositories. Users/customers module or portal 224 (e.g., a user terminal or client device) can access the marketplace via communication with CMS delivery node module or portal 202. In some embodiments, users/customers module or portal 224 can also be in communication with a Content Distribution Network (CDN) module or portal which is further in communication with modules or portals 202 and 206. In some embodiments, the CMS delivery node module or portal 202 can address a first customer interaction when the customer accesses the marketplace platform 200 according to one or more embodiments. For example, the CMS delivery node module or portal 202 can receive a request from a user terminal or portal 224 of the customer to view the available products/services, retrieve product/service data from a product catalog, and generate/present a user interface graphical representation (e.g., column, list, etc.) illustrating available products/services of the marketplace platform or of one or more service providers or vendors. In addition, a product/content team module or portal 222 (e.g., a terminal or client devices of a seller, service provider, vendor, etc.) may also be in communication with the marketplace platform module or portal via communication with the CMS integration module or portal 206. In this case, the CMS integration module or portal 206 can generate and/or present graphical user interfaces relevant to a seller, service provider, vendor, etc. (e.g., user interfaces for listing products for sale, configuring sales listings, generating or editing customer or product configuration profiles, promoting sales activity, etc.).

Still referring to FIG. 2, the marketplace platform module or portal 200 according to one or more embodiments may also include the BSS product stack module or portal 210. Here, module 210 may further include a product catalog module or portal 212 which can be a repository/data storage for storing product/service data. Further, module 212 may also include and store product/service level promotional offers or price reduction indicators or events associated with one or more stored products/services. Module 210 may also include a customer information management (CIM) module or portal 214 which can be a repository/data storage for storing customer information (e.g., name, contact information, ID, customer interest list, customer level promotional offers or price reduction events, etc.). Module 210 may also include a customer interaction management module or portal 216 which can be a repository/data storage for storing information of the customer's interaction with the marketplace platform according to one or more embodiments (e.g., the interaction history of the customer with the interactive elements of the graphical user interface (GUI), communications between the customer and the service provider(s) or other customer(s), etc.)

Still referring to FIG. 2, module 210 can also include a billing/invoice module or portal 218 for storing information associated with the customer's billing/invoicing on a service provided in the marketplace platform (e.g., previously created invoice, billing history, etc.). In addition, module 210 may also include a customer care/sales module or portal 220 for storing information of the sales or customer-related activities (e.g., sales campaign history, promotion activities for a specific type of customer, historical sales analysis, etc.). In some embodiments, module 220 can identify data associated with sales activity and user's experiences, retrieve/collect the data from external data storages or from any of modules or portals 212-218, store such data in a repository included in module 220, and provide such data to the network service provider/vendor when required. As shown, module 220 can also be in communication with the product/content team module or portal 222. Here, the product/content team module or portal 222 can be users or a portal for users (e.g., vendors/service providers) who want to promote/sell network services. In addition, product/content team module or portal 222 can be a lead converter system or users who want to convert customer leads, analyze customer activity, and promote pre-sales and post-sales activities and marketing campaigns.

Still referring to FIG. 2, the marketplace platform module or portal 200 may also be in communication with an orchestrator module 230 (e.g., via an Application Programming Interface (API)). In particular, any one or more of modules or portals 212-220 of module 210 may be in communication with and/or supported by any of modules or portals 238-240 of module 230. Specifically, orchestrator module 230 can include a product/service management module 238 and a cloud orchestration module 240. In particular, any of modules 238-240 can be containerized and stored in a "cloud" or within cloud clusters on external servers and databases. In some embodiments, product/service management module 238 comprises a repository/data storage for storing products and services provided by a vendor/service provider. In some embodiments, the products and services are virtualized or are software-based. In some embodiments, the cloud orchestration module 240 is configured to schedule and provide the products and services to a user of the network services marketplace platform.

Figure 3:
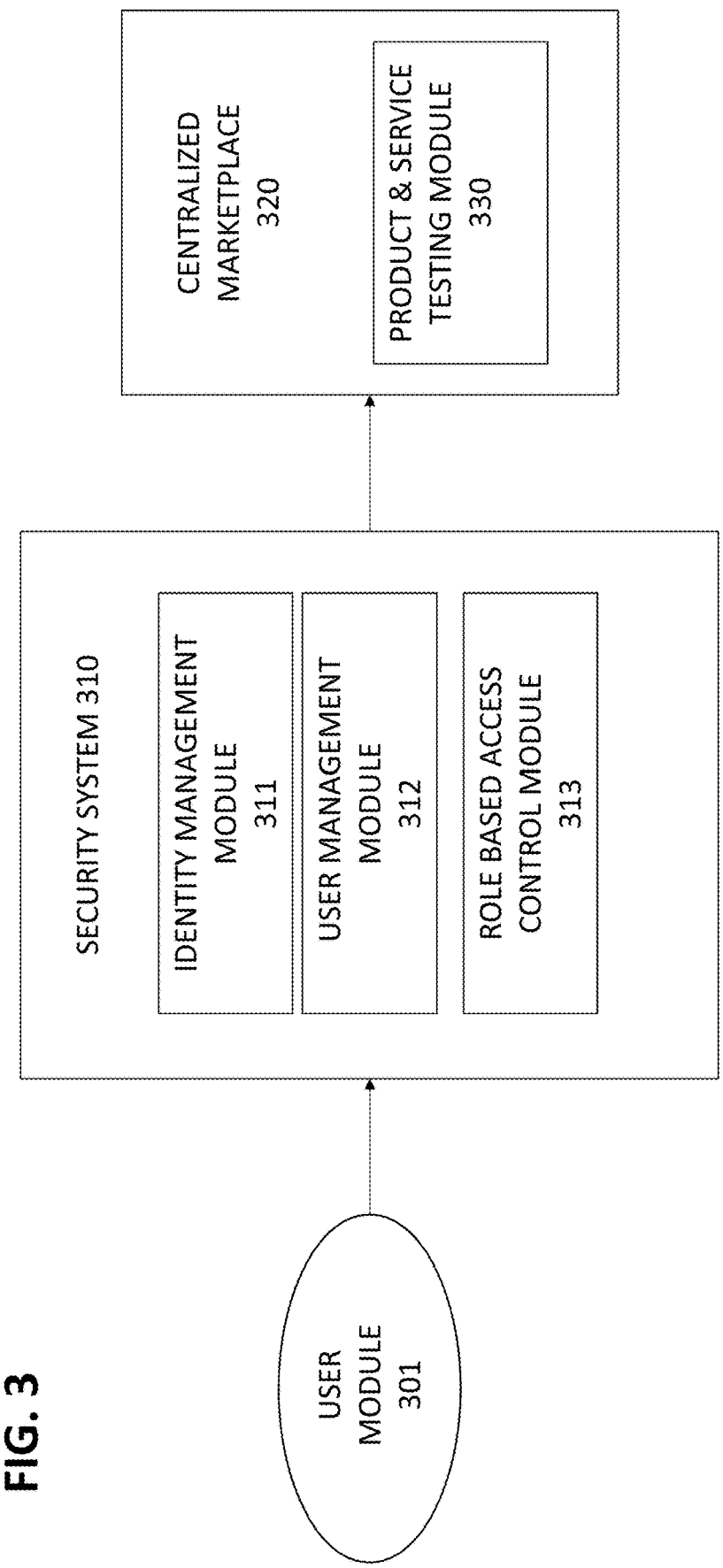
FIG. 3 illustrates a block diagram of a security system for providing role-based access to a centralized marketplace according to one or more embodiments.

FIG. 3 illustrates a block diagram of a security system 310 according to one or more embodiments. The security system 310 controls a role-based user access to a centralized marketplace 320 according to an embodiment. To this end, the security system 310 performs enrollment (i.e., onboarding or registration) of a new user to the centralized marketplace 320 by registering a role to the user, the role being from among a plurality of predetermined roles respectively associated with different sets of access rights and/or privileges. The security system 310 further identifies a previously-registered role of a user and grants access to the centralized marketplace 320 based on that role and its associated rights/privileges.

Referring to FIG. 3, the security system 310 communicates with the centralized marketplace 320 (or may be included in the centralized marketplace 320) and communicates with at least one User Module 301 (i.e., user terminal or device). In an example environment, the security system 310 may connect to at least one User Module 301 and control the role-based user access to the centralized marketplace 320. In another example environment, the at least one User Module 301 may communicate with the centralized marketplace 320, and the security system 310 communicates with the centralized marketplace 320 to control the role-based user access to the centralized marketplace. The security system 310 comprises an Identity Management Module 311, a User Management Module 312, and a Role-Based Access Control Module 313.

As set forth above, the security system 310 performs enrollment of new users to the centralized marketplace 320. In particular, the security system 310 receives registration information of the new user from the User Module 301, the registration information include a selection of a role by the user from among the plurality of predetermined roles (e.g., developer, vendor, customer, etc.). The Role-Based Access Control Module 313 of the security system 310 may identify privileges associated with the selected role and provide the privileges to a system user (e.g., a member of user management team, security admin, etc.) for approval. According to another embodiment, the Role-Based Access Control Module 313 may provide the selected role to the system user for approval. Based on approval of the selected role, the Identity Management Module 311 may generate (or receive from a user) a user ID for the user and provide the ID to the User Management Module 312. The User Management Module 312 may map (i.e., assign) the user ID to the approved user role and the associated privileges. According to another embodiment, at least some of the roles may be automatically assigned to or approved for a user based on, for example, a predetermined rule or a keyword included in the registration information. The mapped role may then be stored in association with the user ID (e.g., stored in a database or storage of the security system 310).

Further, as set forth above, the security system 310 identifies a previously-registered role of a user to grant access to the centralized marketplace 320 based on that role and its associated rights/privileges. In this regard, based on the marketplace 320 (e.g., via a log-in page or user interface of the marketplace 320) receiving login credentials (e.g., user ID and password) of a user that is accessing the marketplace 320, the credentials are provided from the marketplace 320 to the User Management Module 312. The User Management Module 312 obtains the registered role (e.g., from a storage) mapped to the user ID and provides the same to the marketplace 320 such that the marketplace provides access according to the rights/privileges associated with that role (e.g., generates/provides GUIs that include functionalities and information associated with the privileges of the user according to the role of the user, and presents the GUIs to the user).

Based on the role of the user, the User Module 301 may be similar to the users/customers module 224 of FIG. 2. Moreover, based on the role of the user, the User Module 301 may also be similar to a product/content team module 222 of FIG. 2. The communication between the User Module 301 to the marketplace platform module 320 may be similar to the communication between the users/customers module 224, the product content team module 222 in the marketplace platform 200 of FIG. 2, wherein the security system 310 controls the role-based user access to the marketplace 320.

Still referring to FIG. 3, the marketplace 320 comprises a product and service testing module 330. The product and service testing module 330 may be a role-based system emulator for virtualizing a publishing test environment or a telecommunication infrastructure of a network operator to provide a safe test environment (e.g., a test environment segregated from the existing telecommunication infrastructure of a network operator) to test products (e.g., network service) to be published or deployed within the centralized marketplace.

For example, the product and service testing module 330 may include security tests, application tests, integration tests, etc. Here, the security testing may ensure that the products satisfy one or more predetermined security policies (e.g., industry standard security policies). For example, the testing may be performed with respect to all images, configuration files, Helm charts, etc. whenever a user uploads the same to the marketplace. The security checks may include image scanning and test results, based on which a user (e.g., vendor) can proceed to install the application on respective environments. The security checks may further include validating the configuration files and Helm charts for proper indentations (i.e., to ensure zero indentation errors), and verifying if any credentials are exposed as plain text.

The integration testing may validate and reveal the integration between a product (e.g., vendor application) an other dependent services like Monitoring, Performance, Fault, Inventory Management, etc. In an example embodiment, the integration testing may include integrating an application to one or more specific services (e.g., Inventory Management, Monitoring, Ticketing, etc.), verifying valid connections of the integrated application to these services, and verifying if the application is reachable within a specific cluster via, for example, ping, telnet, ssh, etc.

The application testing may allow a user (e.g., vendor) to use their own specific testing scripts, and may be triggered as a part of pre or post installation of a vendor's product (application). To this end, users can upload different types of scripts to test their applications (e.g., yaml, shell, json, python, etc.). These scripts may be stored in a specific storage location from which developers or operations could initiate the application testing.

In an example embodiment, the product and service testing module 330 may be or include a system emulator for virtualizing a telecommunication infrastructure for a developer (e.g., a vendor) to test a product or service for publishing it on the centralized marketplace.

In another example embodiment, the product and service testing module 330 may be or include a system emulator for virtualizing the telecommunication infrastructure for a customer (e.g., a network operator) or a platform administrator to test a product or service for deploying the published product to an existing telecommunication infrastructure.

According to an example embodiment, the role-based user access and the role-based type of tests to be performed on the product and service testing module 330 can be controlled by the security system 310 or can be pursuant to the roles/privileges registered and managed by the security system 310 as described above.

According to another example embodiment, the security system 310 may comprise or can be communicatively connected to an operation support system that facilitates or allows creating roles for the marketplace and/or configuring permissions (i.e., privileges) for each role.

The user roles and permissions (i.e., predefined roles and permissions) may include at least one of a visitor that can view the landing place and can access leap courses or tutorials of the marketplace platform, a developer that can view and publish telecommunication-related and non-telecommunication-related products and service (e.g., products such as software, virtualized network functions, etc.), an operator that can view among other information published products and services on the marketplace and can deploy new applications to the operator's existing telecommunication infrastructure, a reviewer that can view published products and services (e.g., software applications) on the marketplace and can review products and services as requested by a developer, and an administrator that can view all the deployed and published products and services (e.g., software applications), and can publish and deploy new products and services (e.g., software applications) on the marketplace. Moreover, if the administrator is also an operator, the administrator can deploy new applications (i.e., products) from the marketplace to its existing telecommunication infrastructure. Furthermore, the developer role as set forth above can further comprise the role of a vendor. The vendor can be a third-party seller of the developer's product and services or the developer itself.

Figure 4:
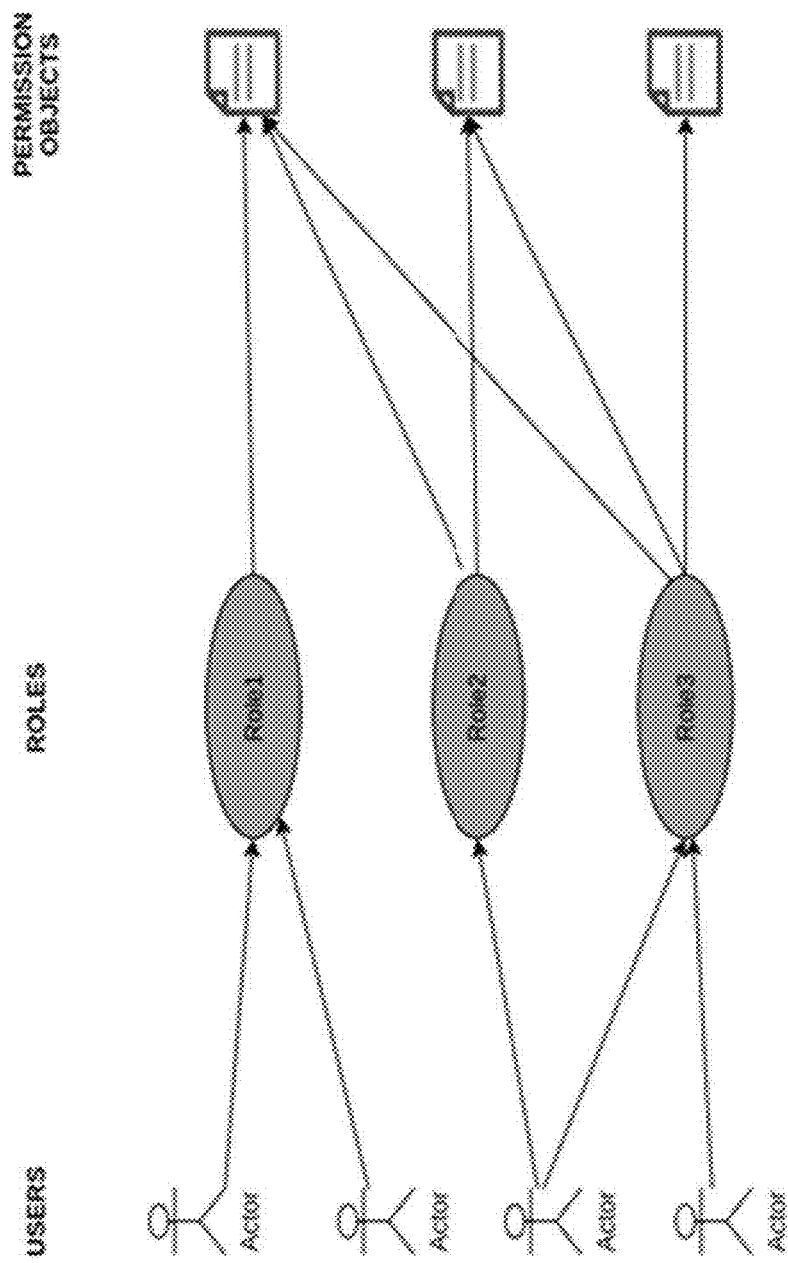
FIG. 4 illustrates a mapping of users to roles and permissions according to one or more embodiments.

FIG. 4 illustrates a mapping of users to roles and permissions according to one or more embodiments. User Management ModuleRole-Based Access Control Module Identity Management Module Referring to FIG. 4, each of a plurality of users are registered by the security system 310 with one or more roles, from among a plurality of predefined roles. Each of the roles is associated with a respective permissions object that includes or defines the permissions or access rights of the corresponding role. For example, the plurality of predefined roles may include visitor, developer, operator, reviewer, and administrator, and the permissions associated with each role may be as provided below in Table 1:

TABLE 1

Roles and Associated Permissions

| Role Name | Permissions in Permission Objects |
|---|---|
| Visitor | Can view the landing place |
| | Can access leap courses of marketplace |
| Developer | Can view and publish application product (e.g., a software application) to the marketplace |
| Operator | Can view the marketplace and deployed products |
| | Can deploy a new products |
| Reviewer | Can view published products (e.g., software applications) |
| | Can review products requested by developer |
| Admin | Can view all the deployed and published products |
| | Can publish and deploy new products |

Figure 5:
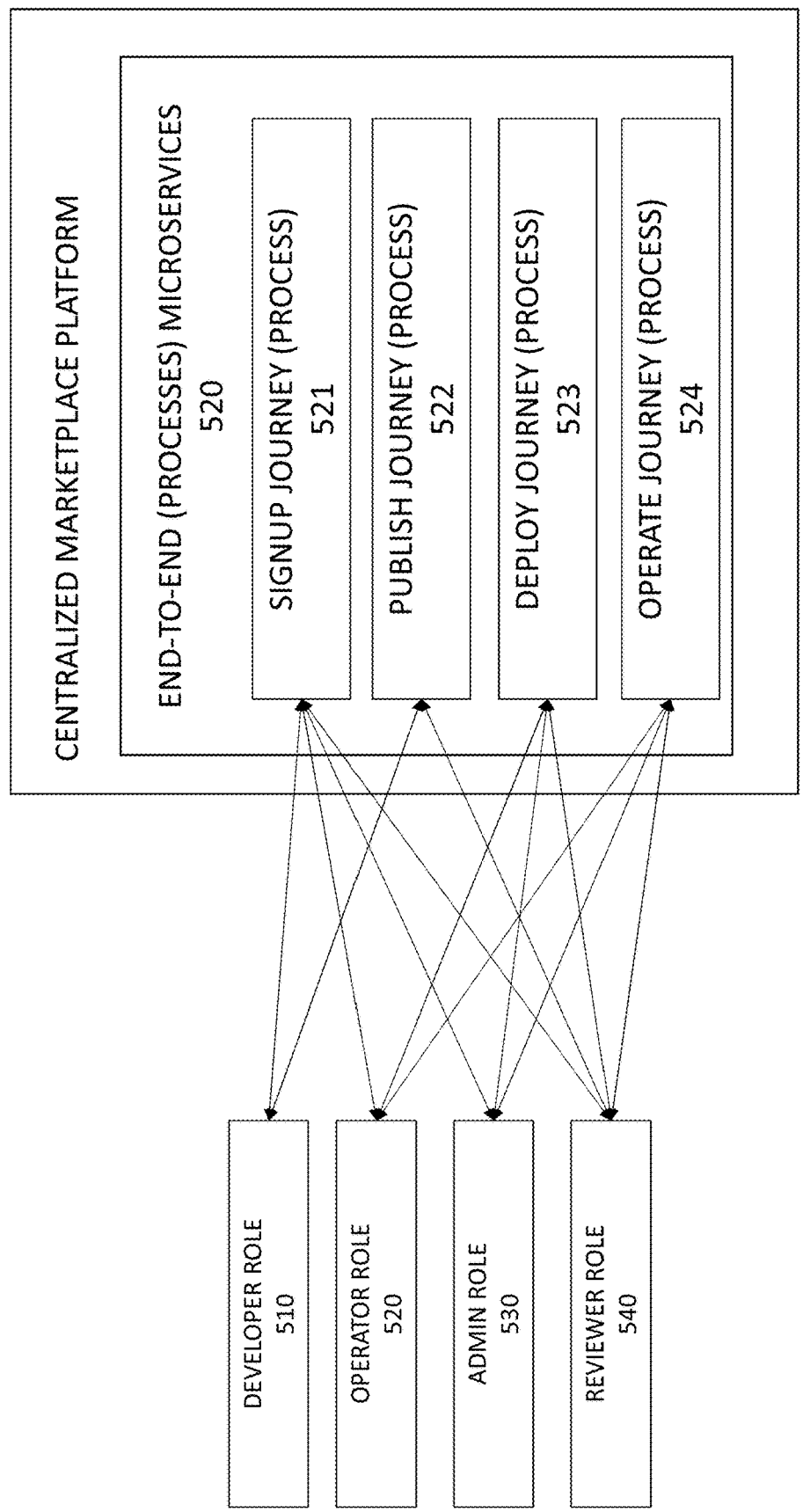
FIG. 5 illustrates a block diagram of role-based end-to-end microservices in a centralized marketplace according to one or more embodiments.

FIG. 5 illustrates a block diagram of role-based end-to-end microservices 520 in a centralized marketplace according to one or more embodiments. In the present example embodiments, the centralized marketplace and the various operations thereof are provided by executing instructions embodied by a microservices architecture, i.e., an application architecture composed of a plurality of independently executable services. It is understood that one or more other embodiments are not limited thereto, and may utilize a different application or software design architecture (e.g., monolithic).

Referring to FIG. 5, a centralized marketplace platform includes role-based end-to-end microservices 520. In an example embodiment, the role-based end-to-end microservices 520 may include a sign-up microservice 521, a publishing microservice 522, a deployment microservice 523, and an operation (i.e., application operation) microservice 524. Each of the microservices described above may be provided as one or more or more microservices. As shown, different types of users (i.e., roles) may be involved in each of the processes of the respective microservices 520. For example, all users are involved in the sign-up process, only users with a developer (e.g., vendor) role and a reviewer role are involved in the publishing process, only users with at least one of a operator (e.g., customer) role, an administrator role and a reviewer role are involved in the deployment process and the operation process. Further, each of the microservices may provide different sets of operations and/or graphical user interfaces (GUIs) for the corresponding process based on a user's role (e.g., the publishing microservice may provide a first set of operations and GUIs to a user with a developer role and a second set of operations and GUIs to a user with a reviewer role, with at least some differences between the two sets).

The sign-up microservice 521 is configured to guide any participant of the marketplace through a sign-up process and allows marketplace participants to be on-boarded and/or authenticated as a user of the marketplace in a standardized manner (i.e., in predetermined user schemas having predetermined roles and privileges).

The publishing microservice 522 is configured to provide a secure and rapid onboarding process of products and services for users with a developer role (e.g., vendors) to the marketplace. The publishing microservice 522 may include a plurality of security and confirmation tests to be executed before finalizing the publication of the products and services on the marketplace.

The deployment microservice 523 is configured to provide a secure and rapid deployment process of products and services for users with an operator role (e.g., customers) in the marketplace. The deployment microservice 523 may include a plurality of compatibility and performance tests to be executed before finalizing the deployment of the products and services on the operator's (e.g., customer's) existing system infrastructure (i.e., telecommunication infrastructure).

The operation (i.e., application operation) microservice 524 is configured to provide a monitoring and lifecycle-control process of products and services for operators (customers) in the marketplace. The operation microservice 524 may include a plurality of monitoring processes to be executed during the operation of the products and services (e.g., during the operation of a software application on the operator's existing telecommunication infrastructure). For example, users with the operator role can view the monitoring and maintenance status of existing products and services, and users with the developer role (e.g., a vendor) can offer maintenance/update products or services in accordance with lifecycle management information provided by the operation microservice 524 in the marketplace.

In an example embodiment, the publishing microservice 522 may generate and present GUIs to allow users with the developer role to upload their products or services (e.g., software applications), product information, parameters, artifacts, etc. Further, the publishing microservice may allow users in the developer role to test their products in a test environment for developers (i.e., publishing test environment). By way of example, the testing may be permitted based on approval by a user with a particular role (e.g., reviewer role or administrator role). The test environment may be a staging (e.g., in a staging server(s)) or sandbox environment associated with the marketplace. Once the developer finalizes the testing successfully, the product or service (e.g., software application) can be published in the marketplace. In an example embodiment, a user in a reviewer role may, via the publishing microservice 522, be provided with one or more GUIs to monitor the testing (e.g., test results) and/or approve the publication of a product or service based on test results.

In an example embodiment, the deployment microservice 523 may provide a set of operations and GUIs for users with an operator (e.g., customer) role to deploy a published product or service from the marketplace. For example, the deployment microservice 523 may allow a user with an operator role to select a published product or service (e.g., a software application) and upload it to a deployment test environment (e.g., staging server). The deployment test environment may be provided in the marketplace platform or on the operator's (e.g., customer's) system infrastructure (e.g., existing telecommunication infrastructure or staging or testing server(s) thereof). For example, users with one of an operator role (e.g., customer), reviewer role, and administrator role can test a product in a deployment test environment in the marketplace. In an example embodiment, once a user with an operator role (e.g., customer) finalizes the deployment testing successfully, the user with the operator role can deploy the product or service (e.g., software applications) to the operator's existing telecommunication infrastructure (e.g., the purchase can be finalized, etc.). Alternatively, the deployment microservice 523 may allow (e.g., provide operations and GUIs) a user with a reviewer role to approve the deployment of the telecommunication-related or non-telecommunication-related product or service based on the deployment test results.

In an example embodiment, the operation (i.e., operation of software application) microservice 524 may provide a set of operations and GUIs for users with the operator role to connect to and select an existing (e.g., deployed, purchased, licensed, etc.) product or service (e.g., a software application), monitor its lifecycle and manage its maintenance. To this end, the operation microservice 524 may connect to a monitoring environment provided in (or associated with) the marketplace. In an example embodiment, users with a particular role (e.g., one of an operator role, reviewer role, and administrator role) can access the operation microservice 524 to manage the maintenance of existing products and services based on respective offers by users in a developer role in the marketplace.

Figure 6:
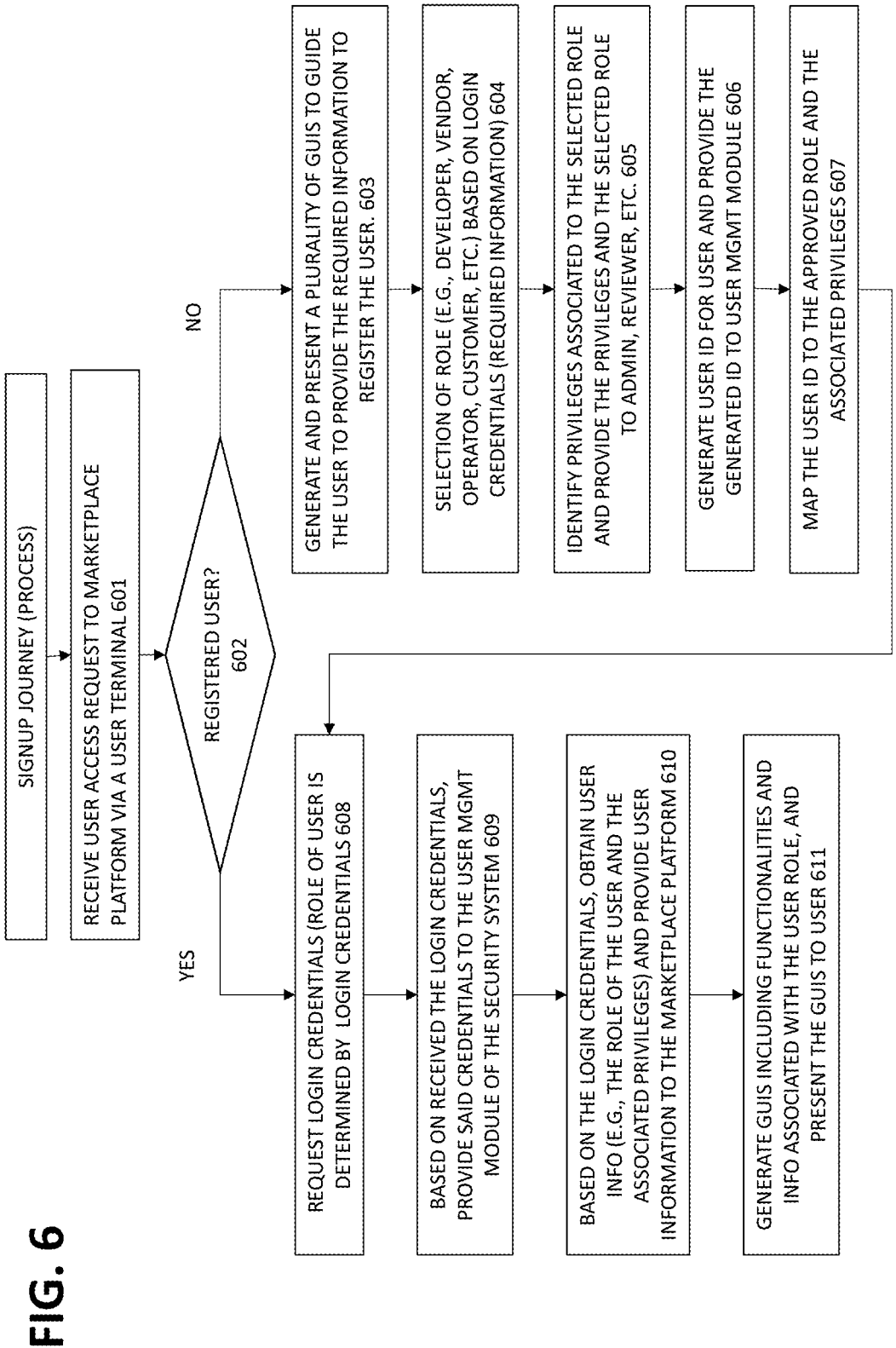
FIG. 6 illustrates a flowchart of a role-based sign-up process to a marketplace platform according to one or more embodiments.

FIG. 6 illustrates a flowchart of a role-based sign-up process to a marketplace platform according to one or more embodiments. The method of FIG. 6 may be performed by the sign-up microservice described above (e.g., in conjunction with the security system described with reference to FIG. 3).

Referring to FIG. 6, in step 601, the marketplace platform receives an access request via a user terminal/module. In an example embodiment, the marketplace platform generates and presents a login page (e.g., in the form of a GUI) to the user and requests the user to log in (i.e., provide authentication credentials such as user ID, password, etc.).

In step 602, the marketplace platform determines whether the user that requested access to the marketplace platform is a registered user (e.g., whether the user clicks a "register" button on the GUI or does not provide valid login credentials).

In step 603, in case the user is not a registered user (NO at step 602), the marketplace platform generates and presents at least one GUI to guide the new user to provide required information to register on the marketplace platform.

In step 604, the marketplace platform receives the information (i.e., registration information) to register the new user via the GUI. Upon receipt of the registration information, the marketplace platform provides the registration information to the security system (e.g., the registration information may include a selection of a role from among a plurality of predetermined roles as set forth above).

In step 605, the security system identifies the user privileges (i.e., what the user is allowed to do with respect to the marketplace) for the marketplace associated with the selected role of the user. In an example embodiment, the Role-based Access Control Module 313 of FIG. 3 may provide the privileges and/or the selected role to a marketplace administrator (e.g., a member of the user management team, a security administrator, etc.) for approval (e.g., based on the business needs and security checkups on the user requesting the role).

In step 606, based on selected role being approved, the approval decision is provided to the Identity Management Module 312, which then generates (or obtains from the registration information) a user ID for the user and provides the user ID to the User Management Module 312 of FIG. 3. In an example embodiment, a user with an administrator role (e.g., a member of the user management team, a security administrator, etc.) can approve the role for the registered user before the Role-based Access Control Module 313 provides the registration information to the Identity Management Module 312. Alternatively, the security system may be configured to automatically assign at least some of the roles or to automatically approve at least some of the roles for a user based on, for example, a predetermined rule or a keyword included in the registration information.

In step 607, the User Management Module 312 maps the user ID to the approved role of the user (e.g., administrator-approved role or automatically approved role) and to the associated privileges. In an example embodiment, the security system provides the registered role (e.g., from the User Management Module 312 or a storage) mapped to the user ID to the marketplace platform such that the marketplace platform provides access according to the rights/privileges associated with that role (e.g., generates/provides GUIs that include functionalities and information associated with the privileges of the user according to the role of the user, and presents the GUIs to the user). In an example embodiment, the user onboarding process for the unregistered user may end with step 607. In an example embodiment, the marketplace platform or the security system may send a confirmation via email (including the generated user ID) to the newly registered user. In another example embodiment, the marketplace platform or the security system may generate and present a GUI to direct the newly registered user back to the login page to input the user's credentials to enter the marketplace.

In step 608, the marketplace platform generates and presents a GUI for requesting login (user) credentials (e.g., the user ID and password) from a user. Here, previously registered users (YES at step 602) or newly registered users (steps 603 to 607) can log in to the marketplace.

In step 609, the marketplace platform provides the login (user) credentials (e.g., the user ID) to the User Management Module of the security system.

In step 610, based on the login (user) credentials, the User Management Module obtains the user's information (e.g., role of the user and associated privileges mapped to the user ID) and provides this information to the marketplace platform.

In step 611, based on the information received in step 610, the marketplace platform provides access according to the rights/privileges associated with that role (e.g., generates/provides GUIs that include functionalities and information associated with the privileges of the user according to the role of the user, and presents the GUIs to the user).

Figure 7:
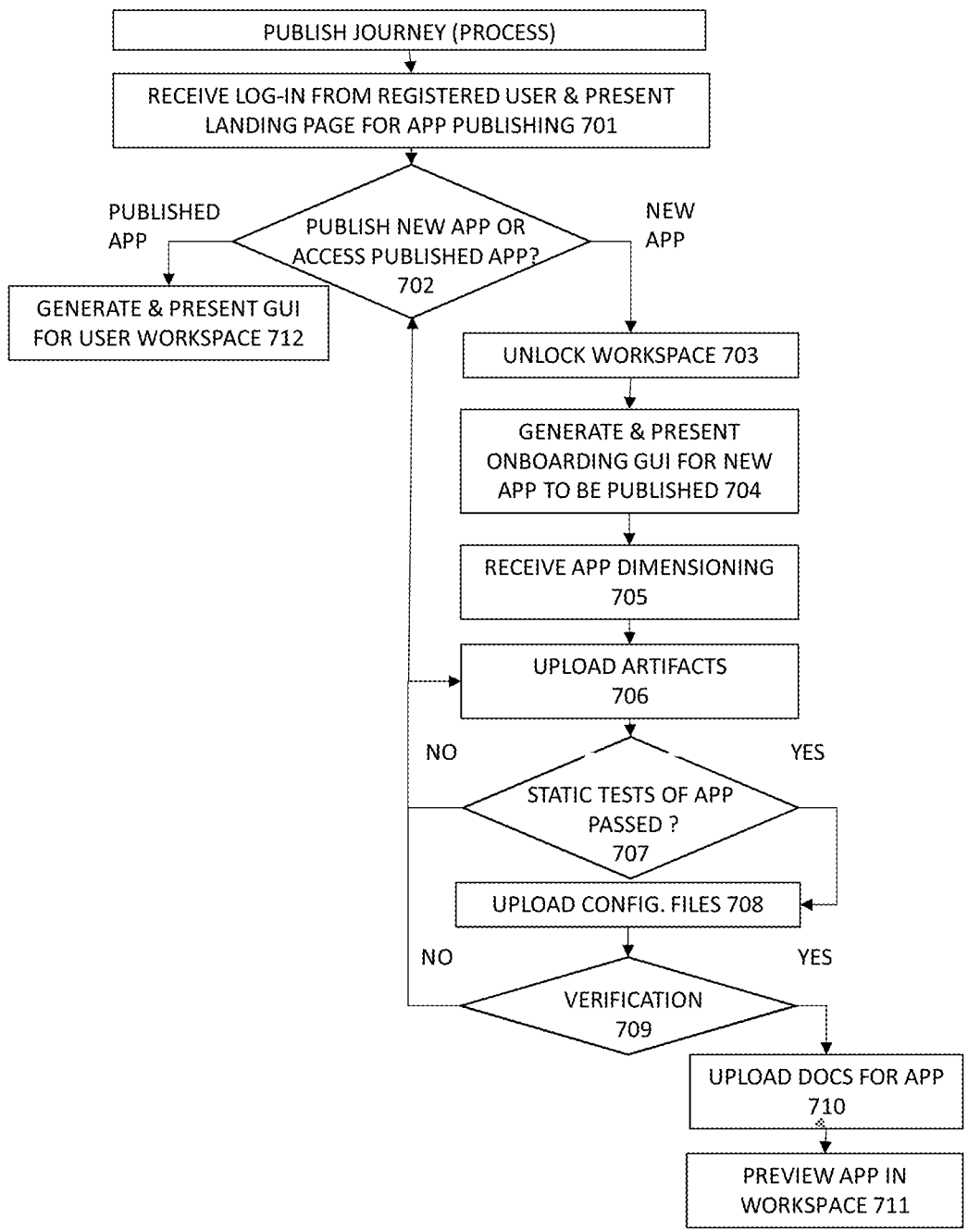
FIG. 7 illustrates a flowchart of a role-based product publishing process of a first-time user on a marketplace platform according to one or more embodiments.

FIG. 7 illustrates a flowchart of a role-based product publishing process of a user on a marketplace (e.g., user in a developer role without previously published product in the marketplace) according to one or more embodiments. The method of FIG. 7 may be performed by the publishing microservice described above with reference to FIG. 5.

Referring to FIG. 7, in step 701, the marketplace platform generates and presents at least one GUI to engage with a registered user (i.e., only registered users are presented with the GUI). In an example embodiment, said GUI may include (or be included in) a landing page for the registered user to start a product publishing process to onboard products and services (e.g., software products) of a user with a developer role (e.g., a vendor). The landing page may be output upon successful login of a user (e.g., user with a developer role) in accordance with the method of FIG. 6.

In step 702, the marketplace platform obtains information (e.g., a user input to the landing page) as to whether the user would like to publish a new application or service to the marketplace or whether the user would like to access a previously published application in the user's workspace. If the user requests to publish a new application, the method proceeds to step 703. Conversely, if the user requests to access a previous workspace (e.g., to access and verify a previously published application), the method proceeds to step 712.

In step 703, the marketplace platform generates and presents a GUI to onboard a product or service (e.g., software product) on the marketplace. In an example embodiment, the marketplace platform may unlock a workspace for a user with a developer role, to which the user may upload and test artifacts, configuration files, etc., of the software product (i.e., application or service). In an example embodiment, the marketplace platform may be configured to provide a workspace that may include a Lab Management Portal to manage the test and release activities of users with a developer role (e.g., vendors) in the marketplace. In another example embodiment, the workspace may include a sandbox test environment (e.g., a development environment) and a staging test environment (e.g., a pre-production environment) on the marketplace platform.

Furthermore, in an example embodiment, the Lab Management Portal may include an application programming interface (API) Manager. Based on the API Manager, third-party API developers can provide (offer) APIs to marketplace participants (e.g., users with a developer role). For example, users with a developer role may sign into the workspace (e.g., Lab Management Portal) to select and subscribe a third-party API to leverage their products and services (e.g., software applications) in the marketplace. In an example embodiment, the workspace (e.g., Lab Management Portal) may use industry-standard APIs, wherein each microservice (e.g., microservices of third parties or a marketplace platform operator) can publish their APIs in an OpenAPI specification (i.e., a swagger format) to get on-boarded into an API gateway of the marketplace platform.

In step 704, the marketplace platform generates and presents a plurality of GUIs to allow a user to onboard a product or service (e.g., software product) on the marketplace (e.g., an onboarding wizard and/or one or more forms for publishing a new product that allows a user to provide product information and upload a product to the workspace in the marketplace). Thus, in step 704, the marketplace platform may receive information on the product In step 705, the marketplace platform generates and presents a plurality of GUIs to allow the user to dimension the hardware requirements in the workspace of the marketplace (i.e., the publishing microservice allows the users to select the necessary hardware resources to test their products in, for example, a sandbox or staging environment). By way of example, the marketplace operator may provide a hardware cluster to run the product or service in a safe test environment in the marketplace. Thus, in step 705, the marketplace platform receives a selection of the product or application dimensioning from the user.

In step 706, the marketplace platform generates and presents a plurality of GUIs to allow the user to upload artifacts of products and services (i.e., software products) to be published. Thus, in step 706, the marketplace platform receives an upload of software artifacts.

In an example embodiment, based on dimensioning the test environment for the product or service and uploading the artifacts necessary to perform testing in the workspace, the user with a developer role can commence a plurality of preparatory activities. To this end, the marketplace platform may generate and present a GUI to allow a user to commence, for example, a virtual private network (VPN) creation, resource allocation, application-centric infrastructure (ACI) network preparation, perimeter network (or screened subnet) (DMZ) network preparation, open batch factory (OBF) integration, load balancer (LB) integration, etc.

In step 707, the marketplace platform obtains test results of, for example, security and compatibility test results (e.g., static test results). In an example embodiment, security and compatibility tests are performed as static tests to identify and resolve shortcomings of products or services (e.g., software application) to be published on the marketplace. Based on the test results, the marketplace platform (or a user of a particular role, e.g., reviewer, administrator, developer, etc.) determines whether the product or service passed the static tests or not. If the product or service is determined to have failed the static tests, the marketplace platform may generate and present a GUI to allow the user (with developer role) to upload a modified (e.g., corrected) version of the product or service (i.e., return to step 706) or may return to the landing page (i.e., return to step 702). If the static testing passes, the method proceeds to step 708.

In step 708, the marketplace platform may generate and present a GUI to allow the user to upload configuration files of the product or service to be published to verify the product at a target location (e.g., on predetermined hardware (clusters) of the marketplace, etc.). Thus, in step 708, the marketplace platform receives configuration files from the user.

In step 709, verification of the product or service is performed. In this case, the marketplace platform may obtain test results of, for example, a system architecture compatibility testing, performance testing, etc. In case the marketplace platform determines that the product or service failed to pass the verification, the marketplace platform may generate and present a GUI(s) to allow the user to upload a corrected (adjusted) version of the product or service (return to step 706) or may return to the landing page (i.e., return to step 702). If the verification succeeds, the method proceeds to step 710.

In step 710, the marketplace platform generates and presents at least one GUI to allow the user to upload documentation of the product or service (e.g., upload technical documents, manuals, specification, sales documents, pricing documents, etc.).

In step 711, based on successful testing and verification of the product or service (e.g., software product), the marketplace platform provides a preview of the publication in the workspace of the user, and the user may then request to publish the application. In an example embodiment, the marketplace platform can generate a dashboard GUI of the product or service on the marketplace. In another example embodiment, the preview in the workspace may be approved for publication by a user in an administrator role. In another example embodiment, the marketplace platform can publish the approved product or service to other users (e.g., customers, network operators, etc.) on the marketplace. Upon successful publication, the marketplace platform may redirect the user with the developer role to the landing page (step 701).

Meanwhile, if the user requests to access a previous workspace (e.g., to access and verify a previously published application) in step 702, the method proceeds to step 712. In step 712, the marketplace platform generates and presents a GUI that allows the user (i.e., developer, vendor) to enter the previous workspace for published (or onboarded) products or services in the marketplace. Here, the user may select a published telecommunication-related or non-telecommunication-related application (or service), select a cluster to install the application, import and install one or more files of the application to the selected cluster, perform verification (e.g., integration and security testing) of the application, receive feedback and review of the verification and resubmit a different or modified version based thereon, store the published and verified application in the workspace, and/or request publication of the verified application.

Figure 8:
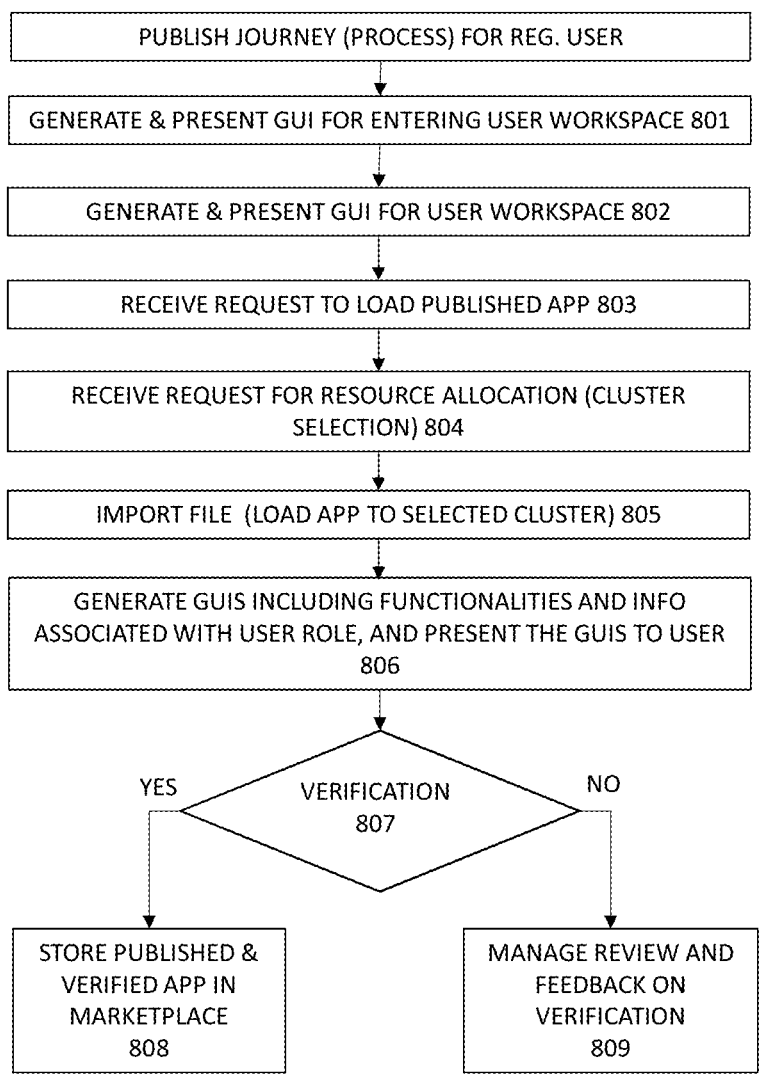
FIG. 8 illustrates a flowchart of a role-based product publishing process of a regular (published) user on a marketplace platform according to one or more embodiments.

FIG. 8 illustrates a flowchart of a role-based product publishing process of a registered user that previously published a product in the marketplace according to one or more embodiments. The method of FIG. 8 may proceed from step 712 of FIG. 7. Further, the method of FIG. 8 may be performed by the publishing microservice described above with reference to FIG. 5.

Referring to FIG. 8, in step 801, the marketplace platform generates and presents a GUI which allows a registered user (e.g., user with developer role) to enter a workspace (e.g., a test environment for publishing a product or service in the marketplace).

In step 802, the marketplace platform generates and presents a GUI which allows a registered user to commence tests on a product or service and verify a product or service to be published.

In step 803, the user may select or request to load (i.e., transfer) a published product or service (e.g., software application) to a server (e.g., a selected cluster within the marketplace). In an example embodiment, the published product or service can be loaded, for example, in a sandbox, staging or production environment for testing the product or service in the marketplace.

In step 804, the marketplace platform obtains a request for hardware resource allocation (i.e., request for hardware dimensions to run the product in a test environment). In an example embodiment, the test environment may be instantiated on a cluster (e.g., a server cluster) of the marketplace platform operator.

In step 805, in an example embodiment, the marketplace platform allocates the hardware resource for the product or service to be executed in the allocated hardware resource (e.g., selected cluster). Thereafter, the marketplace platform generates and presents a GUI which allows the user to load (e.g., upload) the product or service to be executed in the allocated hardware resource.

In step 806, the marketplace platform generates and presents at least one GUI including functionalities and information associated with the role and privileges of the user to test and verify the product (i.e., the product selected in step 803).

In step 807, verification of the product is performed. If the product is verified (e.g., if the product passes the static tests (e.g., integration and/or security tests), the method proceeds to step 808. In an example embodiment, the verification in step 807 (and in step 709 of FIG. 7) can be performed by a user with a reviewer role or in a platform administrator role. The users with the reviewer role and/or platform administrator role may approve the publication of the verified product after successful verification.

In step 808, the marketplace platform obtains the results of the verification and determines that product or service passed the verification. In this case, the verified and approved product or service (e.g., software application) may be published in the marketplace. For example, the product may be published as verified in the marketplace.

If the product does not pass the verification of step 808, the method proceeds to step 809. In step 809, the marketplace platform generates and presents at least one GUI that allows the user with the developer role to manage and review the verification attempt and any feedback. In an example embodiment, the marketplace platform generates and presents at least one GUI that allows a user to resolve the feedback from a reviewer or platform administrator in order to obtain a successful verification and approval to publish the product or service on the marketplace.

Figure 9:
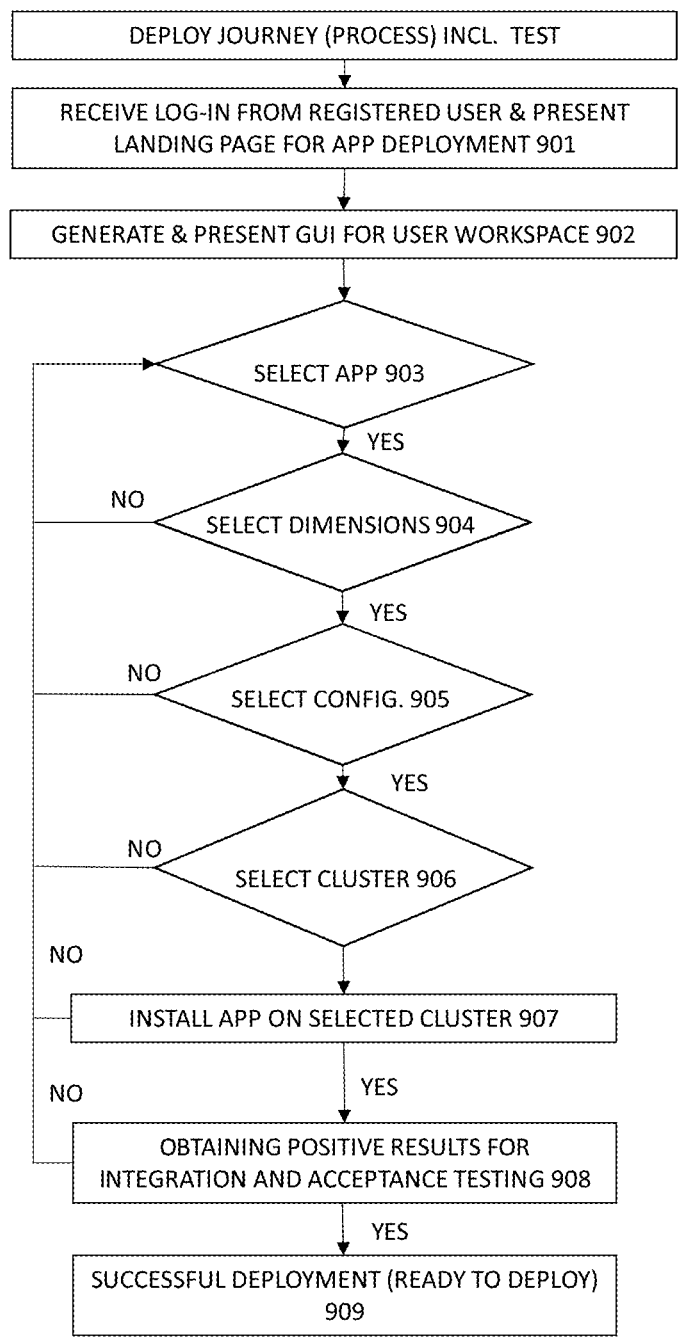
FIG. 9 illustrates a flowchart of a role-based deployment process on a marketplace platform according to one or more embodiments.

FIG. 9 illustrates a flowchart of a role-based deployment process (including a deployment test) on a marketplace platform according to one or more embodiments. The method of FIG. 9 may be performed by the deployment microservice described above with reference to FIG. 5.

Referring to FIG. 9, in step 901, the marketplace platform generates and presents a GUI (e.g., on a landing page) that allows a user with an operator role (e.g., a customer, network operator, etc.) to deploy a product or a service. Here, the landing page may be output upon successful login of a user (e.g., user with a customer or operator role) in accordance with the method of FIG. 6. In an example embodiment, the product or service has been approved and published in the marketplace before a deployment test of the product can be commenced on the marketplace. In this case, the product or service (e.g., software application) may be loaded from the marketplace to the deployment workspace of the user (customer/operator). In another embodiment, the product or service may have already passed static testing (e.g., passed security testing on the marketplace) and is in a pre-published or pre-verified state in the marketplace.

In step 902, the marketplace platform generates and presents a GUI that allows the user with the operator/customer role to enter a deployment workspace (i.e., a deployment workspace of the user) in the marketplace platform. In this case, the marketplace platform may generate and present a GUI that allows the user to enter the workspace and view previously selected products (i.e., a product that the user has previously selected from the marketplace to deploy). Here, the user may have previously viewed the products offered in the marketplace and selected a product f for deployment. In an example embodiment, the marketplace platform can generate and present a GUI that allows a user to view the deployment status of a product or service.

In step 903, the marketplace platform generates and presents a GUI that allows the user to select a product or service from among the previously selected product(s) from the marketplace. Further, in an example embodiment, the marketplace platform may generate and present a GUI that allows the user to request a release of a pre-published product (e.g., from a user with a developer role) in the marketplace platform. Thus, in step 903, the marketplace platform receives a selection of a product from the user.

In step 904, the marketplace platform generates and presents a GUI that allows the user to select hardware dimensions for performing a deployment test in a test environment. Thus, in step 904, the marketplace platform receives a selection of dimensions from the user. The hardware dimensions (i.e., hardware resources) to execute the product or service for the deployment test may be different from those of the static tests, verification, and performance tests in the publication workspace. In case the hardware dimensions (i.e., the hardware resources) do not match the requirements of the product or services, the marketplace platform can generate and present a GUI that allows the user to roll back and select another product or service (e.g., select another version of the product or service in step 903) to meet the designated hardware dimensions for the deployment of the product or service.

In step 905, the marketplace platform generates and presents a GUI that allows the user to select a configuration of the product or service to be deployed. Thus, in step 905, the marketplace platform receives a selection of a configuration from the user. In an example embodiment, the marketplace platform generates and presents a GUI that allows the user to request a modification of the configuration of the product or services to meet deployment requirements. In case the configuration of the product or service does not match the requirements of the product or services, the marketplace platform can generate and present a GUI that allows the user to roll back and select another product or service (e.g., select another version of the product or service in step 903) to meet the designated configuration for the deployment.

In step 906, the marketplace platform generates and presents a GUI that allows the user to select a cluster (i.e., hardware resources, hardware locations such as particular cluster in data center, etc.). Thus, in step 906, the marketplace platform receives a selection of a cluster from the user. In an example embodiment, the cluster can be a cluster of a marketplace platform operator. In another embodiment, the cluster may be a cluster in the existing telecommunication infrastructure of the user with the customer/operator role or a server (e.g., staging server, sandbox, etc.) thereof. In an example embodiment, the deployment workspace may connect to third-party hardware resources, wherein the marketplace platform can generate and present a GUI that allows the user to select hardware resources of third parties to commence deployment tests. In case there is no suitable hardware resource available (i.e., no cluster meets the requirements for the product or service), the marketplace platform can generate and present a GUI that allows a registered user (i.e., customer, network operator) to roll back and select another product or service (e.g., select another version of the product or service in step 903) to meet the designated hardware resources for the deployment.

The selection of clusters from different hardware resource providers has the advantage that users can test the product or service in a test environment that takes into account (e.g., emulates) the existing hardware conditions of their existing telecommunication infrastructure (or cloud infrastructure in which a selected product would be deployed).

In step 907, the marketplace platform generates and presents a GUI that allows the user to install (e.g., upload, execute, etc.) the product or services on the selected cluster. Thus, in step 907, the marketplace platform installs the product on the selected cluster. If the installation fails, the method may return to step 903.

In step 908, testing (e.g., integration and acceptance testing) is performed with respect to the installed application, and the marketplace platform obtains test results. Here, the marketplace platform may generate and present a GUI that allows the user to view test results of deployment tests (i.e., tests of the product or service (e.g., a software application) in the deployment workspace). In an example embodiment, the deployment tests are acceptance tests of the product or service (e.g., a software application). If the testing fails, the method may return to step 903.

In step 909, the marketplace platform generates and presents a GUI that allows the user to finalize the deployment of the product or service (e.g., a software application) on their existing infrastructure. In an example embodiment, the marketplace platform generates and presents a GUI that allows users of one or more particular roles (e.g., operator role, reviewer role and administrator role) to review of the deployment results and settle the purchase of the product or service between a user with a developer role (e.g., a vendor) and a user with an operator role (e.g., a customer) in the marketplace.

Figure 10:
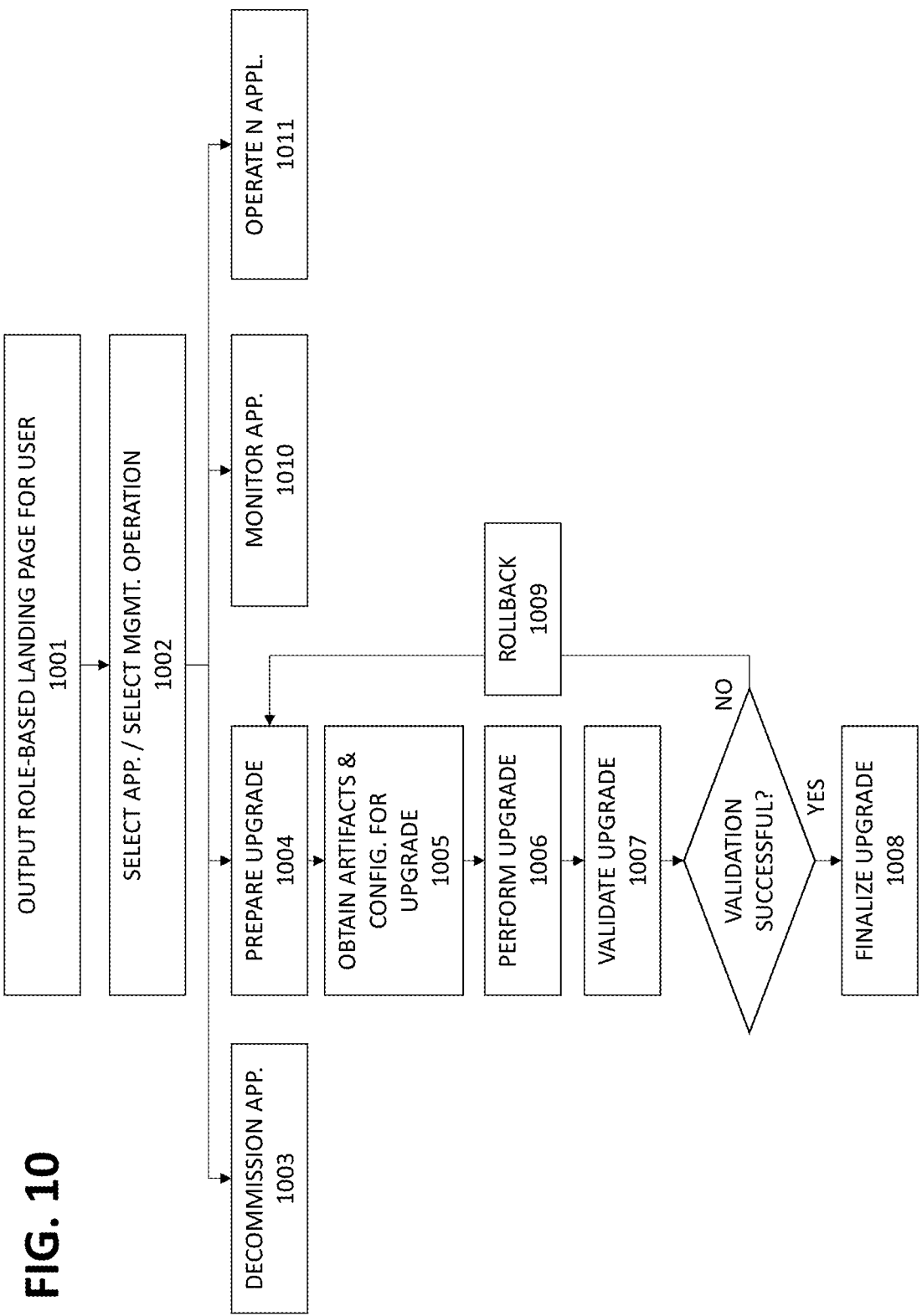
FIG. 10 illustrates a flowchart of a role-based operation process on a marketplace platform according to one or more embodiments.

FIG. 10 illustrates a flowchart of a role-based operation process on a marketplace platform according to one or more embodiments. The method of FIG. 10 may be performed by the operation microservice described above with reference to FIG. 5.

Referring to FIG. 10, in step 1001, the marketplace platform generates and presents a GUI (e.g., on a landing page) that allows a user with an operator role (i.e., customer, network operator) to manage (e.g., monitoring and maintenance) a deployed product or service (e.g., software application). Here, the landing page may be output upon successful login of a user (e.g., user with an operator role) in accordance with the method of FIG. 6. The landing page may be the same landing page as that described for FIG. 9, or a different landing page.

In step 1002, the marketplace platform generates and presents a GUI that allows the user to select an application (i.e., product) from among the user's applications (e.g., previously deployed). In an example embodiment, the product or service (e.g., software application) may have already been deployed or uploaded to the user's existing infrastructure. Thus, in an example embodiment, the marketplace platform provides management, maintenance, and lifecycle services for users with an operator role in an operation workspace of the marketplace.

Further, in step 1002, the marketplace platform receives a selection of an application and a selection of a management operation from among a plurality of predetermined operations. The plurality of predetermined operations in the present example embodiment includes decommissioning, upgrading, monitoring, and operations.

If the selected operation is decommissioning, the method proceeds to step 1003 and the application is decommissioned. In this case, the marketplace platform may delete the product or service (e.g., software application) from an inventory of the user's applications (e.g., a list of applications deployed by the user, where said list is stored and presented to the user on a GUI of the marketplace), or a status of the application in the user's inventory may be changed to decommissioned (or the like). That is, in an example embodiment, the decommissioning of the product or service (e.g., software application) may be an abandonment of the product from the listed (deployed) products or services (e.g., software application) of a registered user in the marketplace.

If the selected operation of step 1002 is upgrading, the method proceeds to step 1004. In step 1004, the marketplace platform receives a user selection of at least one of a versioning, dimensioning, and configuration of the upgrade.

In step 1005, based on the user selection of step 1004, the marketplace platform obtains the corresponding artifacts and adds the selected configuration thereto, and provides the same to the user for the upgrade.

In step 1006, the upgrade is performed. In step 1007, the upgraded application is validated. If the validation is successful, the upgrade is determined as successful in step 1008. Conversely, if the validation fails, the method proceeds to step 1009, where the upgrade is rolled back. With respect to steps 1006 to 1009, the marketplace platform may provide one or more GUIs to the user, which include status information of the upgrade. Alternatively, where the product is deployed in the marketplace platform itself (e.g., where the customer/operator is the marketplace operator or the customer/operator infrastructure is integrated at least in part with the marketplace platform), the marketplace platform itself performs the upgrading, validation, and rollback steps.

Next, if the selected operation of step 1002 is monitoring, the method proceeds to step 1010. In step 1010, the marketplace platform generates and presents a GUI that allows the user (i.e., customer, network operator) to monitor a product or service (e.g., software application) existing in the user's inventory (i.e., deployed from the marketplace). In this case, the marketplace platform may itself perform monitoring and maintenance (e.g., OBF (application logs and traces), fault management, performance management, etc.) where the product is deployed in the marketplace platform itself or accessible to the marketplace platform, or the marketplace platform may receive via API calls and/or communication/coordination with the user's infrastructure (operator telecommunications or cloud infrastructure) results of such monitoring and maintenance and present the same on a GUI.

If the selected operation of step 1002 is operations (i.e., to operate the application/product), the marketplace platform provides one or more GUIs for operations of the selected application in step 1011. For example, the marketplace platform may instantiate hardware resources (e.g., hardware resources for a virtual network service) to operate the product or service (e.g., software application) on the user's telecommunication infrastructure.

Figure 11:
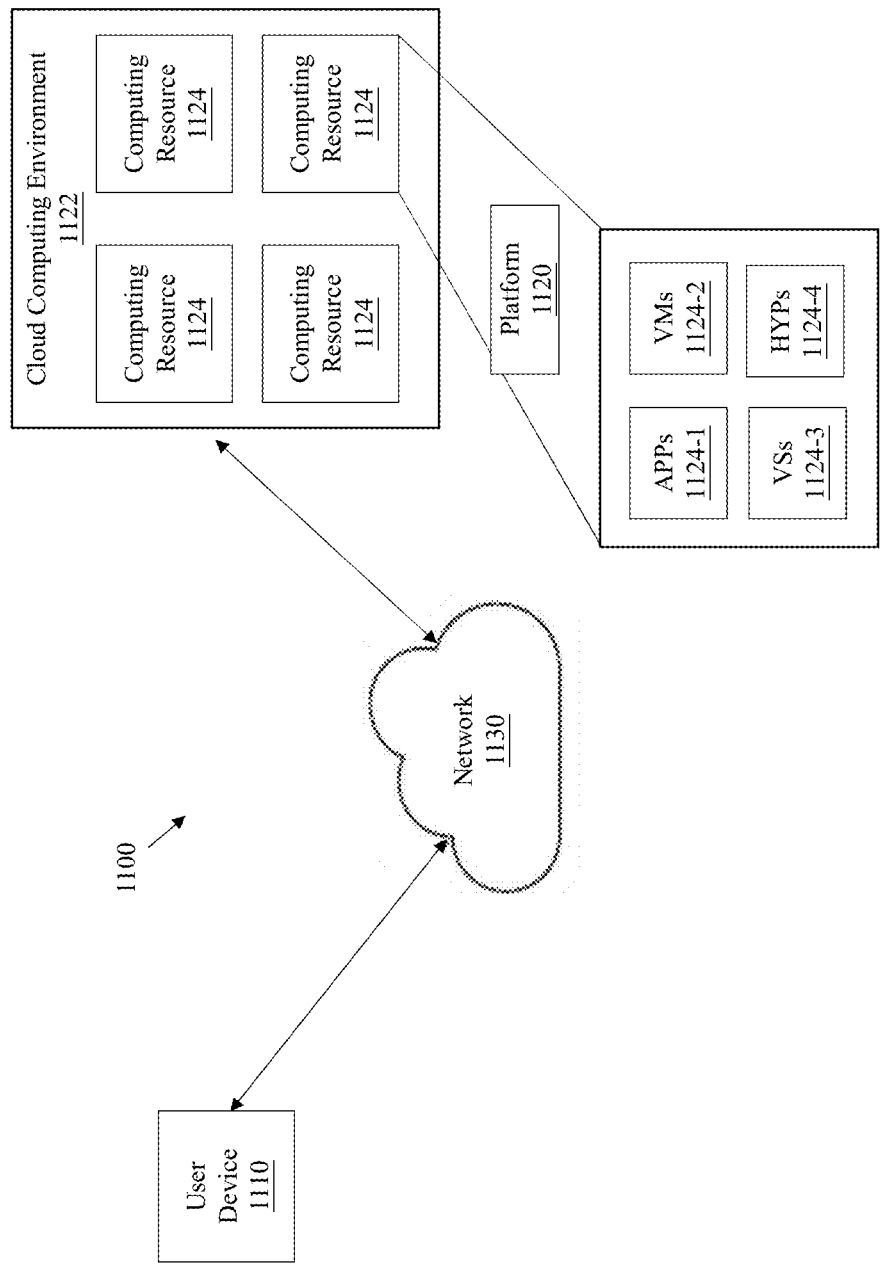
FIG. 11 is a diagram of an example environment in which systems and/or methods, described herein, may be implemented.

FIG. 11 is a diagram of an example environment 1100 in which systems and/or methods, described herein, may be implemented. As shown in FIG. 11, environment 1100 may include a user device 1110, a platform 1120, and a network 1130. Devices of environment 1100 may interconnect via wired connections, wireless connections, or a combination of wired and wireless connections. In embodiments, any of the functions and operations described with reference to FIGS. 1 through 10 above may be performed by any combination of elements illustrated in FIG. 11.

User device 1110 includes one or more devices capable of receiving, generating, storing, processing, and/or providing information associated with platform 1120. For example, user device 1110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 1110 may receive information from and/or transmit information to platform 1120.

Platform 1120 includes one or more devices capable of receiving, generating, storing, processing, and/or providing information. In some implementations, platform 1120 may include a cloud server or a group of cloud servers. In some implementations, platform 1120 may be designed to be modular such that certain software components may be swapped in or out depending on a particular need. As such, platform 1120 may be easily and/or quickly reconfigured for different uses.

In some implementations, as shown, platform 1120 may be hosted in cloud computing environment 1122. Notably, while implementations described herein describe platform 1120 as being hosted in cloud computing environment 1122, in some implementations, platform 1120 may not be cloud-based (i.e., may be implemented outside of a cloud computing environment) or may be partially cloud-based.

Cloud computing environment 1122 includes an environment that hosts platform 1120. Cloud computing environment 1122 may provide computation, software, data access, storage, etc., services that do not require end-user (e.g., user device 1110) knowledge of a physical location and configuration of system(s) and/or device(s) that hosts platform 1120. As shown, cloud computing environment 1122 may include a group of computing resources 1124 (referred to collectively as "computing resources 1124" and individually as "computing resource 1124").

Computing resource 1124 includes one or more personal computers, a cluster of computing devices, workstation computers, server devices, or other types of computation and/or communication devices. In some implementations, computing resource 1124 may host platform 1120. The cloud resources may include compute instances executing in computing resource 1124, storage devices provided in computing resource 1124, data transfer devices provided by computing resource 1124, etc. In some implementations, computing resource 1124 may communicate with other computing resources 1124 via wired connections, wireless connections, or a combination of wired and wireless connections.

As further shown in FIG. 11, computing resource 1124 includes a group of cloud resources, such as one or more applications ("APPs") 1124-1, one or more virtual machines ("VMs") 1124-2, virtualized storage ("VSs") 1124-3, one or more hypervisors ("HYPs") 1124-4, or the like.

Application 1124-1 includes one or more software applications that may be provided to or accessed by user device 1110. Application 1124-1 may eliminate a need to install and execute the software applications on user device 1110. For example, application 1124-1 may include software associated with platform 1120 and/or any other software capable of being provided via cloud computing environment 1122. In some implementations, one application 1124-1 may send/receive information to/from one or more other applications 1124-1, via virtual machine 1124-2.

Virtual machine 1124-2 includes a software implementation of a machine (e.g., a computer) that executes programs like a physical machine. Virtual machine 1124-2 may be either a system virtual machine or a process virtual machine, depending upon use and degree of correspondence to any real machine by virtual machine 1124-2. A system virtual machine may provide a complete system platform that supports execution of a complete operating system ("OS"). A process virtual machine may execute a single program, and may support a single process. In some implementations, virtual machine 1124-2 may execute on behalf of a user (e.g., user device 1110), and may manage infrastructure of cloud computing environment 1122, such as data management, synchronization, or long-duration data transfers.

Virtualized storage 1124-3 includes one or more storage systems and/or one or more devices that use virtualization techniques within the storage systems or devices of computing resource 1124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1124-4 may provide hardware virtualization techniques that allow multiple operating systems (e.g., "guest operating systems") to execute concurrently on a host computer, such as computing resource 1124. Hypervisor 1124-4 may present a virtual operating platform to the guest operating systems, and may manage the execution of the guest operating systems. Multiple instances of a variety of operating systems may share virtualized hardware resources.

Network 1130 includes one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) of environment 1100 may perform one or more functions described as being performed by another set of devices of environment 1100.

Figure 12:
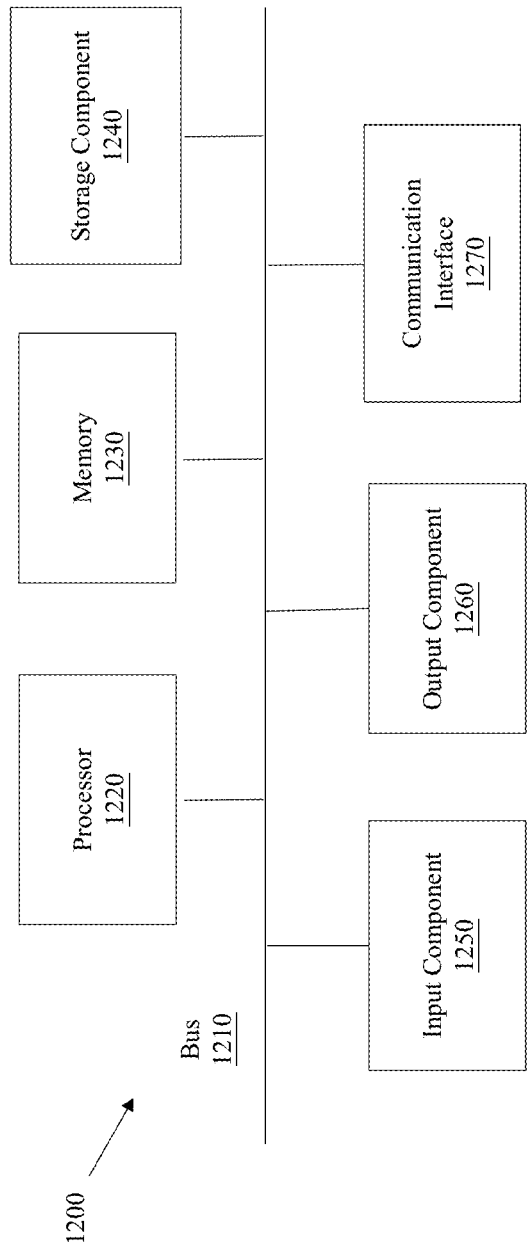
FIG. 12 is a diagram of example components of a device according to an embodiment.

FIG. 12 is a diagram of example components of a device 1200. Device 1200 may correspond to user device 1110 and/or platform 1120. As shown in FIG. 12, device 1200 may include a bus 1210, a processor 1220, a memory 1230, a storage component 1240, an input component 1250, an output component 1260, and a communication interface 1270.

Bus 1210 includes a component that permits communication among the components of device 1200. Processor 1220 may be implemented in hardware, firmware, or a combination of hardware and software. Processor 1220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1220 includes one or more processors capable of being programmed to perform a function. Memory 1230 includes a random access memory (RAM), a read only memory (ROM), and/or another type of dynamic or static storage device (e.g., a flash memory, a magnetic memory, and/or an optical memory) that stores information and/or instructions for use by processor 1220.

Storage component 1240 stores information and/or software related to the operation and use of device 1200. For example, storage component 1240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1250 includes a component that permits device 1200 to receive information, such as via user input (e.g., a touch screen display, a keyboard, a keypad, a mouse, a button, a switch, and/or a microphone). Additionally, or alternatively, input component 1250 may include a sensor for sensing information (e.g., a global positioning system (GPS) component, an accelerometer, a gyroscope, and/or an actuator). Output component 1260 includes a component that provides output information from device 1200 (e.g., a display, a speaker, and/or one or more light-emitting diodes (LEDs)).

Communication interface 1270 includes a transceiver-like component (e.g., a transceiver and/or a separate receiver and transmitter) that enables device 1200 to communicate with other devices, such as via a wired connection, a wireless connection, or a combination of wired and wireless connections. Communication interface 1270 may permit device 1200 to receive information from another device and/or provide information to another device. For example, communication interface 1270 may include an Ethernet interface, an optical interface, a coaxial interface, an infrared interface, a radio frequency (RF) interface, a universal serial bus (USB) interface, a Wi-Fi interface, a cellular network interface, or the like.

Device 1200 may perform one or more processes described herein. Device 1200 may perform these processes in response to processor 1220 executing software instructions stored by a non-transitory computer-readable medium, such as memory 1230 and/or storage component 1240. A computer-readable medium is defined herein as a non-transitory memory device. A memory device includes memory space within a single physical storage device or memory space spread across multiple physical storage devices.

Software instructions may be read into memory 1230 and/or storage component 1240 from another computer-readable medium or from another device via communication interface 1270. When executed, software instructions stored in memory 1230 and/or storage component 1240 may cause processor 1220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 12 are provided as an example. In practice, device 1200 may include additional components, fewer components, different components, or differently arranged components than those shown in FIG. 12. Additionally, or alternatively, a set of components (e.g., one or more components) of device 1200 may perform one or more functions described as being performed by another set of components of device 1200.

In embodiments, any one of the operations or processes of FIGS. 1 through 10 may be implemented by or using any one of the elements illustrated in FIGS. 11 and 12.

Example embodiments of the present disclosure provide a method and system in which enrollment and onboarding processes of network services, as opposed to manually onboarding network services on-site, are simplified and automated. The centralized enrollment and onboarding processes can save time and resources, and, in particular, the automation minimizes human errors and compatibility failures and improves customer satisfaction and reduces business risks for users (e.g., service providers), among other benefits. Further, by automating the enrollment and onboarding of users (e.g., service providers) in a centralized and guided manner, the online marketplace platform provides customers (e.g., network operators) with a simple, flexible, cost-effective, efficient, and rapidly implementable solution for network service selection. For the user (e.g., service providers), the enrollment and onboarding process of network services provides a low-risk test environment with minimal impact on the customer (e.g., network operators) to provide high-quality service without burdening customers with a high volume of requests.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer-readable medium at any possible technical detail level of integration. Further, one or more of the above components described above may be implemented as instructions stored on a computer readable medium and executable by at least one processor (and/or may include at least one processor). The computer-readable medium may include a computer-readable non-transitory storage medium (or media) having computer-readable program instructions thereon for causing a processor to carry out operations.

The computer readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming languages such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for automated and role-based control of a centralized marketplace for products, the system comprising:
   a memory storing instructions, and
   at least one processor configured to execute the instructions to:
   map a first role, from among a plurality of predetermined roles of marketplace participants, to a first user based on first registration information obtained from the first user,
   map a second role, from among the plurality of predetermined roles of marketplace participants, to a second user based on second registration information obtained from the second user;
   execute, for the first user, at least one first microservice of the centralized marketplace based on the first role of the first user, the first role being a developer role; and
   execute, for the second user, at least one second microservice of the centralized marketplace based on the second role of the second user, the second role being a customer role,
   wherein the at least one first microservice comprises a publishing process for publishing a product of the first user in the centralized marketplace,
   wherein the at least one second microservice comprises a deployment process for deploying the product to an infrastructure of the second user,
   wherein the at least one processor is further configured to execute the instructions to:
   map a fourth role, from among the plurality of predetermined roles of marketplace participants, to a fourth user, the fourth role being an administrator role, and
   execute, for the fourth user, at least one fourth microservice of the centralized marketplace based on the fourth role of the fourth user,
   wherein the at least one fourth microservice comprises an approval process, and
   wherein the at least one processor is further configured to execute the instructions to execute the at least one fourth microservice to:
   register the first user with the first role based on the obtained first registration information and approval by the fourth user,
   register the second user with the second role based on the obtained second registration information and approval by the fourth user,
   approve, based on approval by the fourth user, registration of a third user with a third role, from among the plurality of predetermined roles, the third role being a reviewer role, and
   approve the product of the first user for publication on the marketplace based on the publishing process and a reviewing process performed by the third user.

2. The system as claimed in claim 1, wherein the at least one processor is further configured to execute the instructions to:
   obtain, via a first screen for registering a user to the centralized marketplace, the first registration information from the first user and the second registration information from the second user;

receive, via a second screen for logging in to the centralized marketplace, first log-in credentials of the first user and second log-in credentials of the second user; and grant different access rights to the first user and the second user based on the first role and the second role.

3. The system as claimed in claim 1, wherein the at least one processor is further configured to execute the instructions to execute the at least one first microservice to:

receive artifacts of the product, the product being a software application;

allocate the artifacts to at least one publishing test environment for testing the product;

obtain results of the testing; and present the results to the first user based on the first role.

4. The system as claimed in claim 3, wherein the at least one publishing test environment is hosted by an operator of the centralized marketplace.

5. The system as claimed in claim 3, wherein the products comprise:

enterprise software for telecommunications operators; and virtualized network services.

6. The system as claimed in claim 1, wherein; the at least one processor is further configured to execute the instructions to execute the at least one second microservice to:

receive artifacts of the product, the product being a software application;

allocate the artifacts to at least one deployment test environment for testing the product of the first user;

obtain results of the testing; and present the results to the second user based on the second role.

7. The system as claimed in claim 6, wherein the at least one deployment test environment is hosted by an operator of the centralized marketplace.

8. The system as claimed in claim 6, wherein the products comprise:

published products of users mapped to the first role which have been tested in at least one publishing test environment and approved for publication.

9. The system as claimed in claim 1, wherein the at least one processor is further configured to execute the instructions to:

map a third role, from among the plurality of predetermined roles of marketplace participants, to a third user, the third role being a reviewer role;

execute, for the third user, at least one third microservice of the centralized marketplace based on the third role of the third user, wherein the at least one third microservice comprises a reviewing process for reviewing the product submitted by the first user for publication.

10. A method for automated and role-based control of a centralized marketplace for products, the method comprising:

mapping a first role, from among a plurality of predetermined roles of marketplace participants, to a first user based on first registration information obtained from the first user, mapping a second role, from among the plurality of predetermined roles of marketplace participants, to a second user based on second registration information obtained from the second user;

executing, for the first user, at least one first microservice of the centralized marketplace based on the first role of the first user, the first role being a developer role; and executing, for the second user, at least one second microservice of the centralized marketplace based on the second role of the second user, the second role being a customer role, wherein the at least one first microservice comprises a publishing process for publishing a product of a first user in the centralized marketplace, wherein the at least one second microservice comprises a deployment process for deploying the product to an infrastructure of the second user, wherein the method further comprises:

mapping a fourth role, from among the plurality of predetermined roles of marketplace participants, to a fourth user, the fourth role being an administrator role, and executing, for the fourth user, at least one fourth microservice of the centralized marketplace based on the fourth role of the fourth user, and wherein the at least one fourth microservice comprises an approval process comprising:

registering the first user with the first role based on the obtained first registration information and approval by the fourth user, registering the second user with the second role based on the obtained second registration and approval by the fourth user, approving, based on approval by the fourth user, a registration of a third user with a third role, from among the plurality of predetermined roles, the third role being a reviewer role, and approving the product of the first user for publication on the marketplace based on the publishing process and a reviewing process performed by the third user.

11. The method as claimed in claim 10, further comprising:

obtaining, via a first screen for registering a user to the centralized marketplace, the first registration information from the first user and the second registration information from the second user;

receiving, via a second screen for logging in to the centralized marketplace, first log-in credentials of the first user and second log-in credentials of the second user;

granting different access rights to the first user and the second user based on the first role and the second role.

12. The method as claimed in claim 10, wherein the executing the at least one first microservice comprises:

receiving artifacts of the product, the product being a software application;

allocating the artifacts to at least one publishing test environment for testing the product;

obtaining results of the testing; and presenting the results to the first user based on the first role.

13. The method as claimed in claim 12, wherein the at least one publishing test environment is hosted by an operator of the centralized marketplace.

14. The method as claimed in claim 12, wherein the products comprise:

enterprise software for telecommunications operators, and virtualized network services.

15. The method as claimed in claim 10, wherein the executing the at least one second microservice comprises:

receiving artifacts of the product, the product being a software application;

allocating the artifacts to at least one deployment test environment for testing the product of the first user;

obtaining results of the testing; and presenting the results to the second user based on the second role.

16. The method as claimed in claim 15, wherein the at least one deployment test environment is hosted by an operator of the centralized marketplace.

17. The method as claimed in claim 15, wherein the products comprise:

published products of users mapped to the first role which have been in at least one publishing test environment for testing the product of the first user in the centralized market place.

18. The method as claimed in claim 10, further comprising:

mapping a third role, from among the plurality of predetermined roles of marketplace participants, to a third user, the third role being a reviewer role;

executing, for the third user, at least one third microservice of the centralized marketplace based on the third role of the third user, wherein the at least one third microservice comprises a reviewing process for reviewing the product submitted by the first user for publication.

* * * * *